United States Patent [19]
Holmes et al.

[11] Patent Number: 5,514,878
[45] Date of Patent: May 7, 1996

[54] POLYMERS FOR ELECTROLUMINESCENT DEVICES

[76] Inventors: Andrew B. Holmes, 19 Newton Road, Cambridge CB2 2AL; Richard H. Friend, 37 Barton Road, Cambridge; Stephen C. Moratti, 3 Belvoir Road, Cambridge CB4 1JQ; Derek R. Baigent, Churchill College, Cambridge; Donal D. C. Bradley, 86 Green Oak Avenue, Totley, Sheffield; Raoul Cervini, 51 Akeman Street, Cambridge CB4 3AT; Neil C. Greenham, 190 Chesterton Road, Cambridge CB4 1NE; Peter J. Hamer, 12 Lawrence Way, Kings Hedges, Cambridge CB4 2PR, all of United Kingdom

[21] Appl. No.: 210,327

[22] Filed: Mar. 18, 1994

[51] Int. Cl.[6] .............................. H01L 35/24; H01L 51/00
[52] U.S. Cl. .............................. 257/40; 257/13; 257/103; 313/504
[58] Field of Search .............................. 257/40, 13, 103; 313/504

[56] References Cited

FOREIGN PATENT DOCUMENTS

| | | |
|---|---|---|
| 0024762 | 11/1981 | European Pat. Off. . |
| 75233 | 8/1970 | Germany . |
| 3228880 | 2/1984 | Germany . |
| WO90/13148 | 11/1990 | WIPO . |
| WO92/03491 | 3/1992 | WIPO . |
| WO92/03490 | 3/1992 | WIPO . |
| WO92/16023 | 9/1992 | WIPO . |

OTHER PUBLICATIONS

Debord et al., *Bulletin de la Societe Chimique de France*, 4:1393–1408 (1971).
Funke et al., *Mitteilung aus dem Forschungsinstitut fur Pigmente und Lacke e.V.*, Stuttgart (1963).
Helbig et al., "Investigation of Poly(arylene–vinylene)s: Electrochemical studies on poly(p–phenylene–vinylene)s", *Makromol. Chem.*, 194:1607–1618 (1993).
Horhold, *Z. Chem.*, 12.Jg:41–52 Heft 2 (1972).
Hsieh, "Dehydrochlorination Route to New Soluble Poly(p–phenylene vinylene) Architectures", *Polym. Mater. Sci. Eng.*, 67:252–253 (1992).
Kossmehl et al., *Chem. Ber.*, 112:2342–2346 (1979).
Kossmehl, "Semiconductive Conjugated Polymers", *Ber. Bunsenges. Phys. Chem.*, 83:417–4426 (1979).
Lenz et al., "Thermally Stable Hydrocarbon Polymers: Polyterephthalylidenes", *J. Org. Chem.*, 25:813–817 (1960).
Sarker et al., "Substituted Poly(1,4–phenylene vinylene)s by the Soluble Precursor Method for Electro–Optic Applications", *Polymer Preprints*, 35:790–791 (1994).
Schroter et al., "High–Resolution Solid–State $^{13}$C NMR Spectroscopy of Poly(1,4–phenylenevinylene)s", *Makromol. Chem.*, 182:3185–3193 (1981).
"Polymer Engineering to Match Electrodes" overhead projection shown at the American Physical Society Meeting, Seattle WA on Mar. 22, 1993.

*Primary Examiner*—Sara W. Crane
*Attorney, Agent, or Firm*—Merchant, Gould, Smith, Edell, Welter & Schmidt

[57] ABSTRACT

This invention provides semiconductive conjugated polymers incorporating electron-withdrawing groups for use in electroluminescent devices, methods for their manufacture, and electroluminescent devices incorporating the polymers. The electron-withdrawing group is conjugatively linked to the polymer chain and is selected so that the polymer exhibits electroluminesence upon application of an electric field to a layer thereof.

39 Claims, 11 Drawing Sheets

POLYMERS FOR ELECTROLUMINESCENT DEVICES

This invention relates to conjugated polymers incorporating electron-withdrawing groups for use in electroluminescent devices, methods for their manufacture, and electroluminescent devices incorporating the polymers.

Electroluminescent devices have been described using both organic polymers and organic molecular compounds. The advantages of these devices over other technologies include the possibility of wide area displays, low d-c working voltages, simple manufacture and light emission encompassing the full visible spectrum. In general, devices made from polymeric materials have additional advantages of mechanical and thermal stability over those made from sublimed molecular films, and can be deposited from solution either as a precursor or a fully conjugated polymer rather than by vapour phase deposition.

Various types of polymers for use in light-emitting devices have previously been described. Fully conjugated polymers (or derivatives thereof) such as poly(p-phenylenevinylene) (PPV) (Burroughes et al., Nature, 1990, 47, 539), poly (3-alkylthiophene)s (Ohmori, Y., Uchida, M., Muro, K., and Yoshino, K., Solid State Commun., 1991, 80, 605) and poly-(p-phenylene) (PPP) (Grem, G., Leditzky, G., Ullrich, B., and Leising, G., Adv. Mater., 1992, 51, 383) amongst others have been used. Improved device efficiencies can be achieved using copolymers containing interrupted conjugation sequences (P. L. Burn, et al., Nature, 1992, 356, 47) and a variety of other materials have been reported (Holmes, A. B. Synth. Met., 1993, 57/1, 4031–4040).

The basic structure of a typical light-emitting device is shown in FIG. 1, and comprises an electron injecting cathode (i), a semi-transparent anode (iv), and an emissive layer (iii) sandwiched between two optional charge transport layers (ii). Light emission occurs when electrons and holes are injected and a hole encounters a negatively charged species in the emissive layer. The resulting singlet exciton can decay by radiative emission of a photon of visible light.

The barrier to hole injection for the majority of simple conjugated polymers such as PPV and PPP is lower than that for electron injection. To improve electron injection into these polymers, and therefore increase the opportunity for singlet exciton formation, two approaches have been used. Firstly, by employing low-work function metals such as calcium as the cathode, efficiencies can in some cases be increased 50–100 fold over metals such as aluminium (Braun, D., and Heeger, A. J., Appl. Phys. Lett., 1991, 58, 1982). The main drawback to this approach is the extreme air and moisture sensitivity of substances such as calcium, which would probably preclude their use in commercial devices. It is advantageous to employ stable, high work-function metals for the cathode. Secondly, more balanced charge injection can be achieved through the use of one or more charge transport layers between the emissive layer and the cathode or anode. A further rise in device efficiency (measured as photons emitted/electrons injected) is attainable by matching electron and hole injection, for example by heterojunction engineering using transport layers (ii) (P. L. Burn, et al., in Electrical, Optical, and Magnetic Properties of Organic State Solid Materials (MRS Symposium N, Fall Meeting Boston 1991), L. Y. Chiang, A. F. Garito and D. J. Sandman, Eds., Mats. Res. Symp. Proc. 1992, 247, 647–654; A. R. Brown, et al., Appl. Phys. Lett., 1992, 61, 2793–2795). The present invention provides a semiconductive conjugated polymer comprising arylene vinylene units forming at least part of the polymer main chain in which a solubilising group is present on at least some of the arylene moieties so as to render the polymer solution processable, and an electron-withdrawing group is conjugatively linked to the polymer chain, wherein the solubilising group and the electron-withdrawing group are selected so that the polymer exhibits electroluminescence upon application of an electric field to a layer thereof. Preferably the electron-withdrawing group is conjugatively linked to at least some of the vinylene moieties.

The presence of the electron-withdrawing groups reduces the barrier to electron-injection into the polymer thereby offering the opportunity to improve the efficiency of the device in electroluminescence when constructed with higher work function cathodes. Typical efficiencies for electroluminescence of the polymers of the present invention are above 0.1%, preferably in the range 0.1 to 0.4%. This represents a significant increase in efficiency as compared with corresponding polymers in the absence of the electron-withdrawing groups. By raising the electron affinity of the polymer with the electron withdrawing groups, the rate of electron-injection into the polymer increases.

Advantageously, the electron-withdrawing group may be selected to modulate the optical properties of the polymer, for example by altering the refractive index of the polymer or by modulating the wavelength of radiation emitted in electroluminescence- Modulation of the optical properties of polymers is further discussed in International Patent Publication No. WO92/03490 of the present applicant. For example, the electron-withdrawing group may be conjugatively linked to the vinylene group through a phenyl group so as to alter the band gap of the polymer.

Suitable electron-withdrawing groups include nitrile, acid amide, carboxyl, ketone and esters. Nitrile groups are preferred. Other electron-withdrawing groups may be selected provided that their presence in the polymer does not interfere with the electroluminescent properties thereof. Sulfones such as $PhSO_2$- are a possibility.

Moreover, the electron-withdrawing groups should preferably be selected so that polymers are readily synthesised and should not therefore interfere with the polymerization process.

For instance, poly(2-nitro-1,4-phenylenevinylene) cannot be synthesised by the standard Wessling route, although copolymers have been suggested (Jung-il, J., Sang-Hyeun, Y., Hong-Ku, S., J. Polymer Sci., Part B, Polymer Phys., 1993, 31, 87).

The presence of the solubilising group in the polymer facilitates both the manufacture of the polymer and assists the processibility of the polymer. It is unnecessary to have a solubilising group on every single monomer unit of the polymer provided that the solubilising groups are present in sufficient concentration to render the polymer usefully processible. Preferably, at least one in four of the monomer units should include a solubilising group, most preferably all the monomer units. The exact solubilising group is not critical provided that it is compatible with the processing medium used for laying down the polymer as a film. Typical solubilising groups for non-polar solvents include long chain alkyl or alkoxy groups, linear or branched, advantageously having four or more carbon atoms preferably five or more. Preferred solubilising groups include hexyloxy groups. For polar solvents such as aqueous solvents, solubilising groups such as carboxylic acids or amines may be used.

The solubilising group may also be selected to modulate the optical properties of the polymer through conjugative, inductive or steric influences. For further detail see International Patent Publication No. WO92/03490.

In the context of the present application a conjugated polymer is understood to be a fully or partially conjugated polymer which possesses a delocalised pi-electron system along the polymer main chain to an extent sufficient to confer semiconducting properties on the polymer and to give the polymer the ability to support positive and negative charge carriers with high mobilities along the main chain. The pi-electron system may be interrupted by unconjugated regions or may be uninterrupted in a fully conjugated polymer. The effects of full and partial conjugation are further discussed in WO92/03490, the subject-matter of which is hereby incorporated by reference. In one embodiment of the present invention, the polymer is a substantially fully conjugated poly(arylene vinylene) polymer and may be a homopolymer or a copolymer.

Throughout this specification the term arylene is intended to include in its scope all types of arylenes including heteroarylenes, as well as arylenes incorporating more than one ring structure, including fused ring structures. Preferred arylene moieties used in the present invention include paraphenylene, thienylene and naphthylene.

A preferred fully conjugated poly(arylene vinylene) polymer has the following general formula:

[Ar-vinylene-Ar'-vinylene]$_n$ in which Ar and Ar' are the same or different and represent arylene groups. Each vinylene is substituted with the electron withdrawing group X, and n represents the degree of polymerisation.

Preferably, the polymer has the general formula:

[Ar—CX=CH—Ar'—CH=CX]$_n$ in which the electron-withdrawing groups alternate in the 1 and 2 positions of the vinylene moiety. This is advantageous because it offers the most versatility and high yields in the synthesis.

In a preferred embodiment, the electron-withdrawing groups are present in a trans configuration so as to produce the thermodynamically preferred double bond geometry.

In a further embodiment of the present invention the polymer comprises unconjugated regions and conjugated regions which incorporate the arylene vinylene units. Preferably, the conjugated regions in the main chain comprise distyrylbenzene moieties which incorporate the arylene vinylene units. The distyrylbenzene moieties may be separated by an aliphatic linker group, for example in accordance with the following general formula:

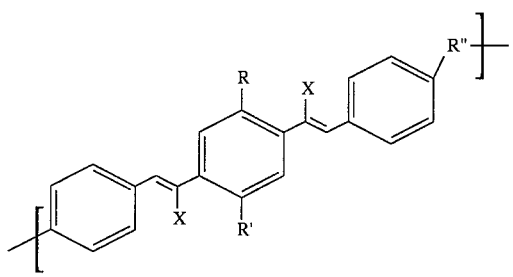

in which at least one of R and R' is a solubilising group, X is the electron-withdrawing group, and R" is the aliphatic linker group.

As a further development of the polymers in the present invention, it is possible to incorporate cross-linkable groups at the ends of substituent groups on the arylene moieties. For example, cross-linkable groups at the ends of alkyl substituents could allow in situ cross-linking.

A further use of alkyl rather than alkoxy side chains would also blue-shift the electroluminescent emission of the polymer.

In a further aspect, the present invention provides an electroluminescent device comprising a semiconductive layer which comprises an emissive layer of semiconductive conjugated polymer, a first contact layer in contact with a first surface of the semiconductive layer, and a second contact layer in contact with a second surface of the semiconductor layer, wherein the polymer comprises arylene vinylene units forming at least part of the polymer main chain, on which is present a solubilising group so as to render the polymer solution processable, and an electron-withdrawing group is conjugatively linked to the polymer main chain, whereby the polymer emits radiation upon application of an electric field between the first and second contact layers.

Electroluminescent devices of this general type are discussed in further detail in U.S. Pat. No. 5247190 of the present applicants, the subject-matter of which is hereby incorporated by reference. In addition to electroluminescent devices, these polymers may also be used either as single layers or as components in multiple layers in photovoltaic devices or in photoconductive devices.

Preferably, the semiconductive conjugated polymer used in the devices is as discussed above.

The polymers according to the present invention can be deposited as high quality transparent layers by spin-coating solutions of the polymer. In the electroluminescent device, the polymers exhibit improved quantum efficiencies as compared with other comparable conjugated polymers, especially when employed with stable high work-function metals. Because the electron-withdrawing groups apparently stabilize the negative charge carriers to such an extent that the barrier to electron-injection is greatly reduced, hole injection or transport may now be the limiting process for maximum device efficiency.

Preferably, the semiconductive layer in the electroluminescent device further comprises a hole-transporting polymer layer between the emissive layer and the first contact layer. Surprisingly, such devices exhibited typical EL efficiencies of 2 to 4%. The hole-transporting polymer layer can be selected to match the first contact layer for hole injection. Preferably, the first contact layer comprises indium-tin oxide and the hole transporting polymer comprises poly(paraphenylenevinylene), polyalkylthiophene or polyphenylene. Additionally, the polymer can be chosen to match an air-stable metal for electron injection. Any suitable metal or alloy may be used such as aluminium or gold. A preferred metal is aluminium. Calcium may also be used as the metal However, calcium is not air stable. Other hole transporting materials might for instance be derived from triarylamines.

The present invention also provides a method of making the semiconductive conjugated polymer. The method comprises reacting a first compound of general formula

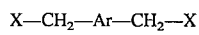
X—CH$_2$—Ar—CH$_2$—X with a second compound of general formula

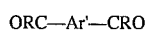
ORC—Ar'—CRO under conditions to produce a polymer comprising at least some regions of

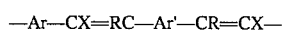
—Ar—CX=RC—Ar'—CR=CX— in which Ar and Ar' are the same or different and represent arylene moieties or arylene-containing moieties, at least some of which are substituted with a solubilising group, X is an electron-withdrawing group and R is alkyl, aryl or hydrogen.

The reaction is preferably performed under base catalysis using any suitable base. Advantageously, the base comprises potassium t-butoxide. Advantageously, the reaction is performed in solvent, preferably t-butyl alcohol and/or tetrahydrofuran (THF), more preferably a 50/50 mixture of the two. Temperature ranges for the reaction are typically from 25° to 60° C., preferably around 35° C. to 50° C. Higher temperatures and more polar solvents are generally undesirable because they tend to promote unwanted side reactions. The time for the reaction is generally in the range 1 minute to 12 hours, usually in the range 3 to 4 hours.

The second compound may be an aldehyde or a ketone, preferably an aldehyde with R=H. The exact reactant compounds are selected in accordance with the products to be produced.

In this embodiment of the present invention the Knoevenagel condensation of arene diacetonitriles and dialdehydes has been used to produce a range of soluble alternating poly(arylenevinylene) polymers with pendant nitrile groups (Scheme 1).

The condensation reaction of aromatic dialdehydes and dinitriles which forms the brightly coloured polymers (Scheme 1, R=H or OMe) has been mentioned in around 12 papers and patents since 1960. In all cases the products were insoluble, infusible and were only characterised by i.r. and u.v. spectroscopy, and electrical (conductivity) and thermal (TGA) measurements, although a solid state NMR study (Schröter, B., Hörhold, H.H., and Raabe, D., Makromol. Chem., 1981, 182, 3185) and an electrochemical study (Helbig, M., Hoerhold, H.H., Makromol, Chem., 1993, 194, 1607) have been reported. The synthesis of these unprocessible polymers was first reported by Lenz, R. W., and Handbuts, C.E.J. Org. Chem., 1960, 25, 813, and later references are: Debord, D., and Gole, J. Bull. Soc. Chim. Fr., 1971, 1393; Debord, D., and Gole, J., Bull. Soc. Chim. Fr., 1971, 1401; Debord, D., and Gole, J., Compt. Rend., 1964, 259, 3022; Funke, W., and Schwetze, E. C., Makromol. Chem., 1964, 74, 71; Klemm, D., Klemm, E., Jerusel, H., Drefahl, G., Hoerhold, H., J. Prakt. Chem., 1978, 320, 767). A number of patents describe their use in electrophotographic processes (Peters, M., Verbunt, J. A., EP-A-24762), and as photoconductors (Drefahl, G., Hörhold, H.H., Opfermann, J., Ger (East) 75233). These materials are insoluble, unprocessible and oligomeric with degree of polymerisation n<7–8 as evidenced by their i.r. spectra and elemental analyses. This is mainly due to the insolubility of these compounds in the solvent used for the polymerization (almost always ethanol or methanol). These polymers are quite useless for electroluminescent devices as described in this patent due to the impossibility of preparing thin films with them, and have not been identified as candidates for electroluminescence studies in any previous paper.

A useful route to produce the embodiment of the polymer in which the conjugation is interrupted requires Ar' to comprise the unit Ar"—R"—Ar'" in which Ar" and Ar'" are the same or different and represent arylene moieties, and R" represents an aliphatic linker group. In this way, the conjugation of the polymer main chain can be interrupted by the introduction of the aliphatic linker group. The linker group is conveniently introduced into the polymer by any suitable method. For example, where R" is —O—(CH$_2$)$_8$—O—, the linker can be introduced as 1,8-dibromooctane to alkylate hydroxy derivatives of the two moieties Ar" and Ar'". This approach can be extended to any suitable alkylating agent, such as any dihaloalkane.

A key step in the present invention is to prepare polymers with long chain solubilising groups, and to use a synthetic process which can be extended to include the synthesis of copolymers. By including long chain alkoxy or alkyl groups as solubilising substituents on the aromatic ring we found that it is possible to produce soluble versions of the cyano-substituted polymers. Additionally, the solubilising groups allowed the condensation process to produce high molecular weight materials (gel permeation analysis against polystyrene standards).

The possibility also exists that a degree of cross-linking may be occurring during the polymerization reaction. Evidence for this cross-linking may be found in the NMR spectral data. It may therefore be advantageous to permit a degree of cross-linking to occur in order to achieve the advantageous properties including fine-tuning of the colour of the polymer, as described above.

The present invention will now be discussed in further detail by way of example only and with reference to the attached drawings in which:

FIG. 1 shows a schematic representation of a typical electroluminescent device;

FIGS. 2(a) to 2(d) and 3(a) to 3(e) show the structural formulae of compounds and polymers discussed below;

SYNTHESIS OF STARTING MATERIALS AND POLYMERS

Figure 1:
Figure 2A:
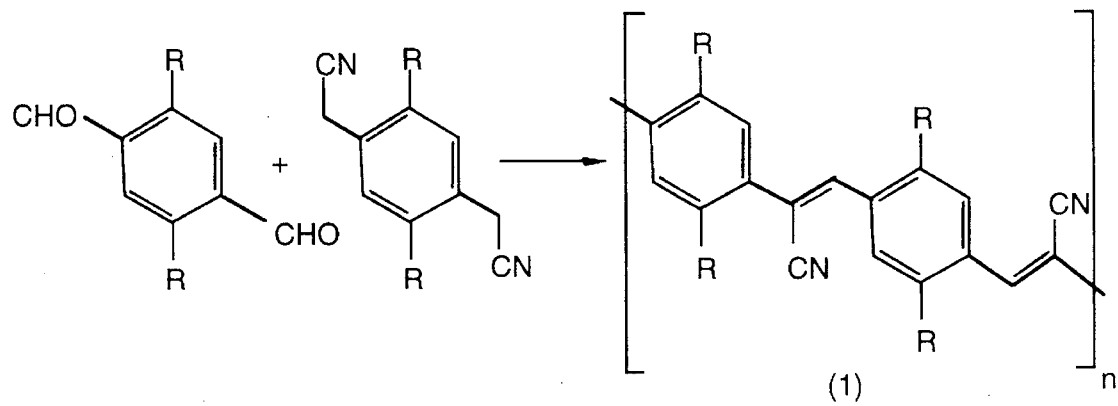
Figure 2B:
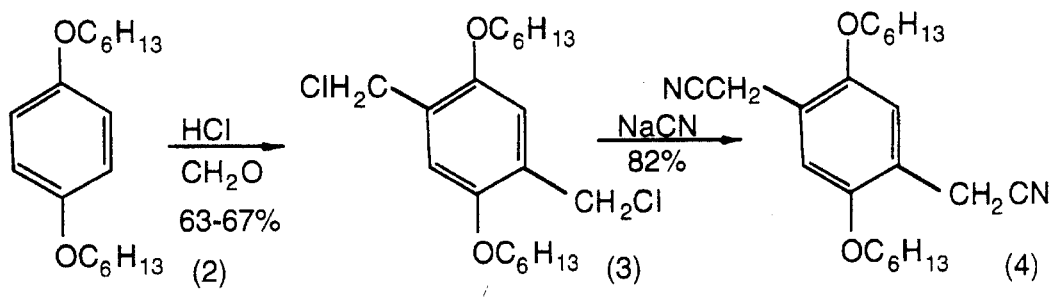
Figure 2C:
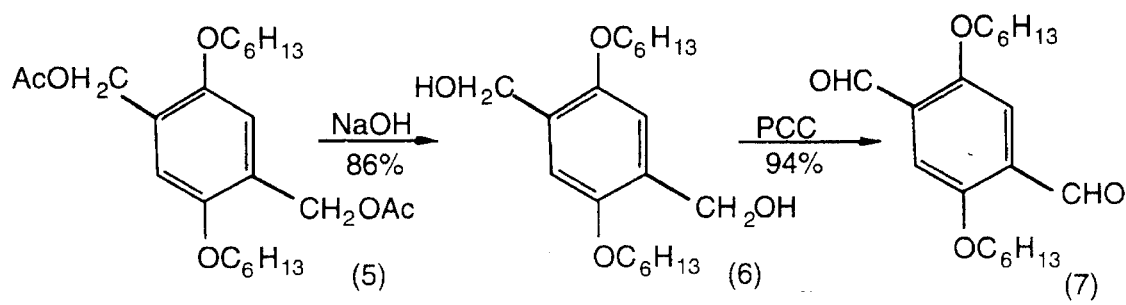
Figure 2D:
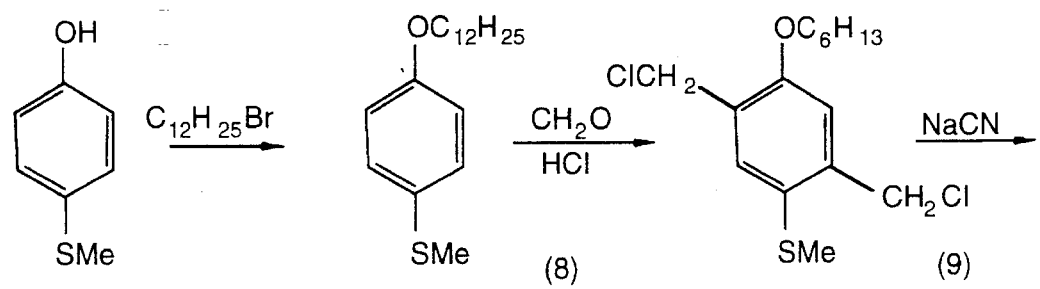
Figure 2D:
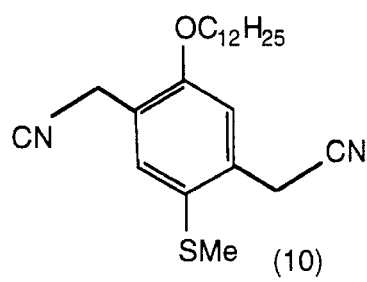
Figure 3A:
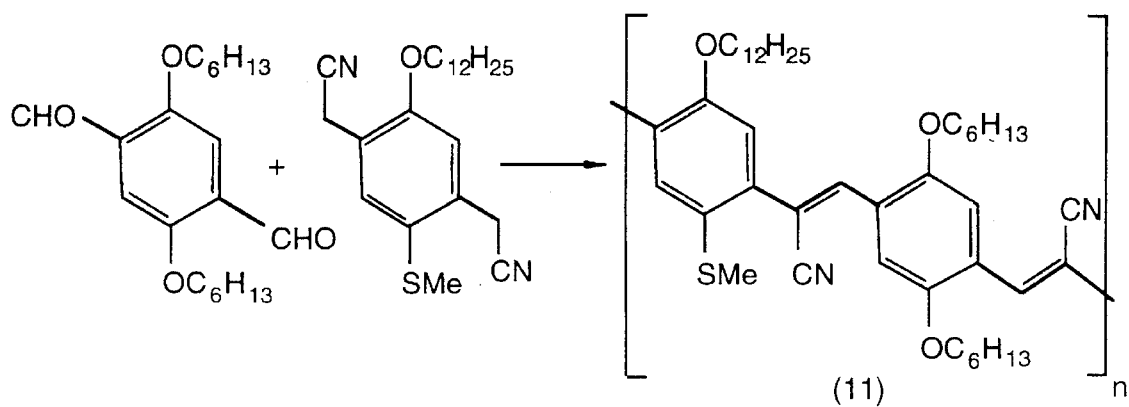
Figure 3B:
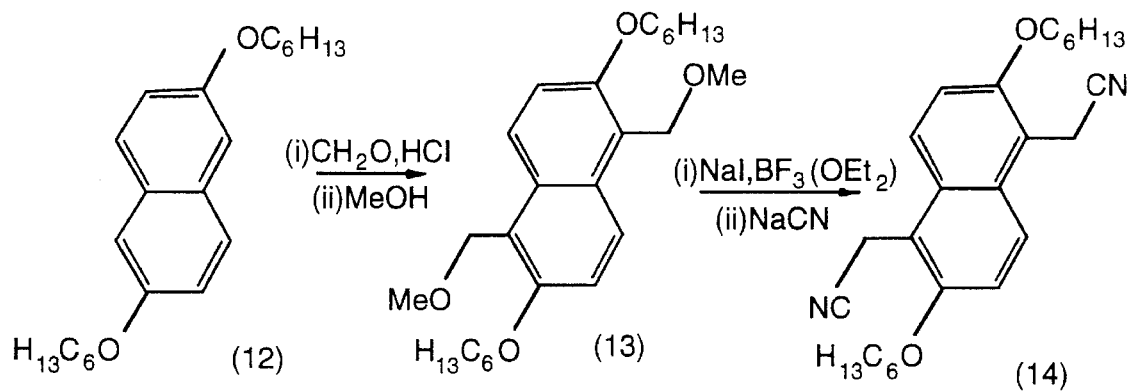
Figure 3C:
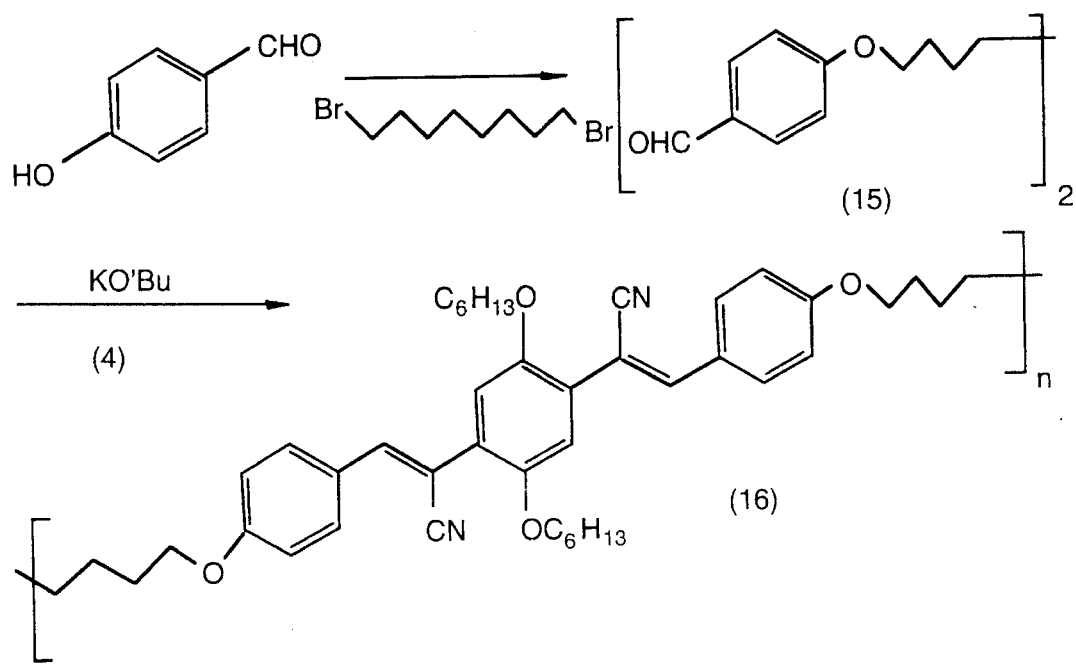
Figure 3D:
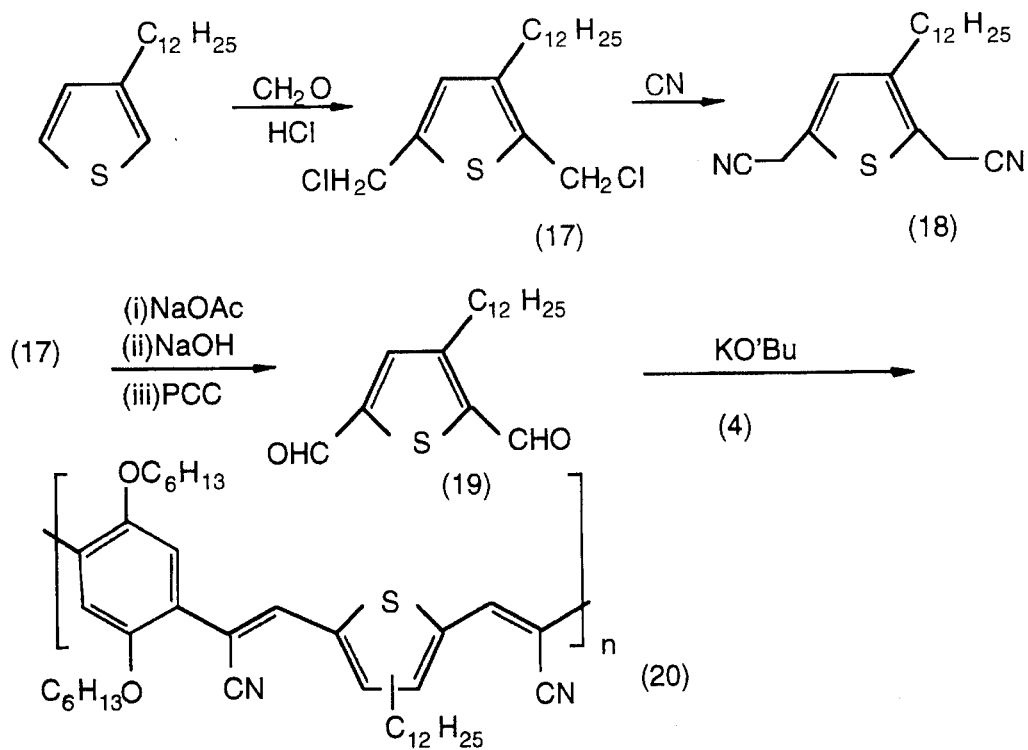
Figure 3E:
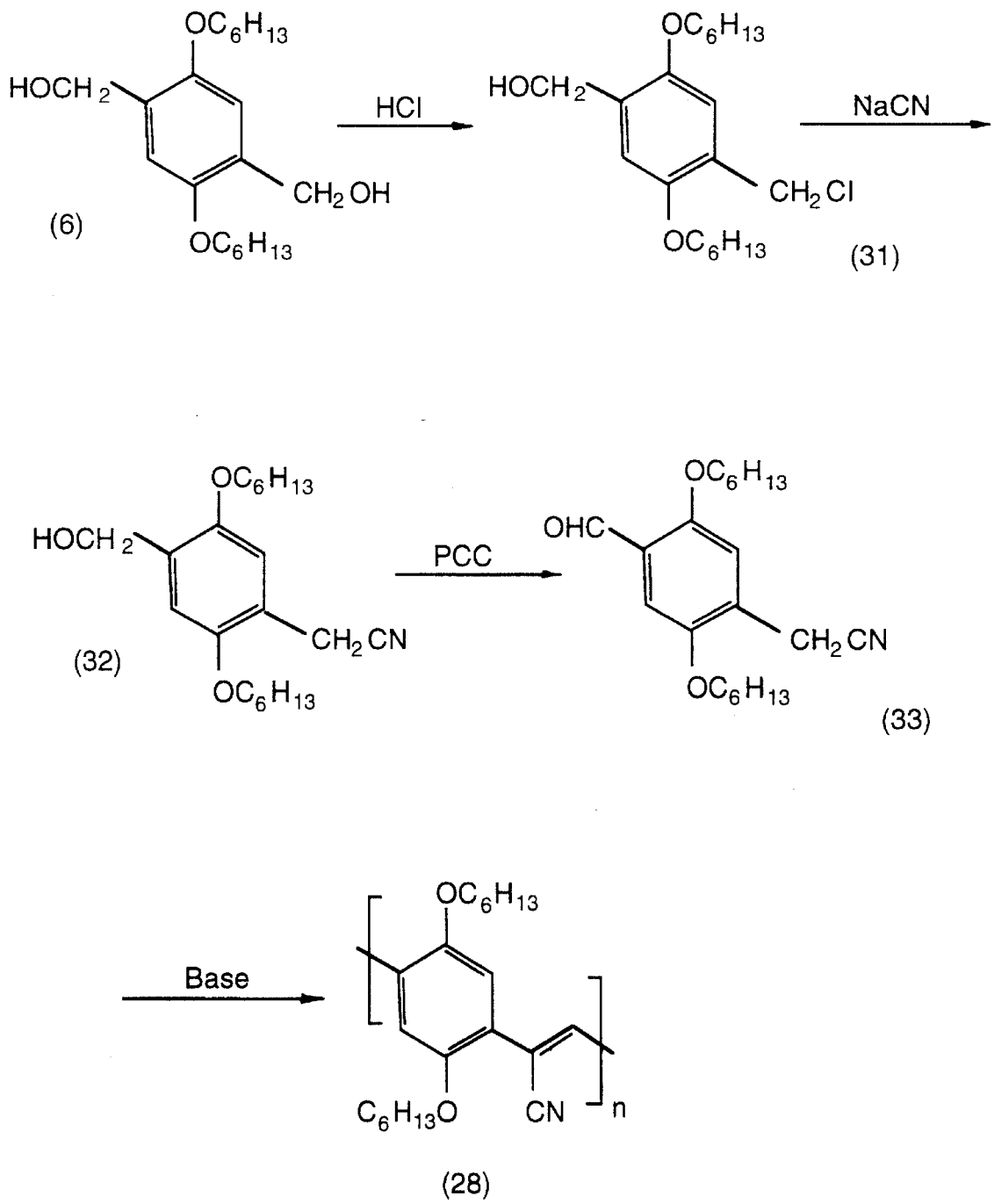

Referring to FIGS. 2 and 3, bischloromethylation of dihexyloxybenzene (2) produced (3) in 63–67% yield. Treatment of (3) with sodium cyanide in DMF at 60° C. gave the dinitrile (4) in 82% yield.

The bischloromethyl compound (3) cannot be converted directly with hydroxide into the diol (6) owing to the likelihood of polymerisation. Thus, it was first converted into the diacetate (5), which then could be safely hydrolyzed to give the diol (6). Oxidation of (6) with pyridinium chlorochromate (PCC) gave the dialdehyde (7) in excellent yield.

The condensation of the dialdehyde (7) with the dinitrile (4) was investigated under a number of conditions. While methanol or ethanol were previously reported as the preferred solvents for such reactions, in the present case only oligomers were produced under these conditions owing to the insolubility of the reaction products. By using less polar solvents such as dichloromethane, some polymer was produced, but in low yield, and the material did not appear fluorescent. However, the preferred reaction solvent was t-butyl alcohol with potassium t-butoxide as the preferred base catalyst; a brightly coloured product (1; $R=OC_6H_{13}$) (CN-PPV) was produced in this solvent in good yield after only a few minutes at 50° C. However, not all of the subsequent polymerisations with other substrates were equally rapid, and in general most required 3–4 h reaction time.

The peak molecular weight distribution of the polymer (1; $R=OC_6H_{13}$) was measured by gel-permeation peak at approximately 10,000 Daltons ($M_n$ 8,900; $M_W$ chromatography (GPC) (polystyrene standards) indicating a 30,000). The aromatic portion of the $^1H$ NMR spectrum usually showed only 3 peaks, indicating the absence of noticeable side-reactions (such as Michael-addition to the alkene groups). The solid state absorbance of a thin film (300 nm) of the polymer was similar to that of poly[2-methoxy-5-(2'-ethylhexyloxy)-1,4-phenylenevinylene] (MEH-PPV) with a main broad absorbance peak at 490 nm (onset of absorbance at ca. 600 nm). The photoluminescence spectrum was slightly more red-shifted than MEH-PPV, with a single broad emission centred around 1.93 eV.

Light emitting devices were constructed by spin-coating a solution of the polymer in chloroform onto indium-tin oxide (ITO) substrates, followed by evaporation of a metal as the top electrode (the thickness of the organic layer was around 300 nm, which required driving voltages of 30–35 V). The electroluminescence spectrum proved to be identical to the spectrum measured by photoluminescence. Surprisingly, there was no noticeable difference in quantum efficiencies between the use of aluminium or calcium as the cathode, which is most unusual in these devices. Both metals exhibited about 0.1–0.3% internal quantum efficiency, which indicates that electron injection is no longer the limiting factor for efficient light output.

With the aim of further improving the balance of electron and hole injection, a two layer device was constructed. A layer of PPV was placed between the nitrile polymer and the ITO. These devices produced light with an emission spectrum similar to that of CN-PPV, but with greatly improved efficiencies. Maximum internal quantum efficiencies of 3% were achieved using calcium or aluminum as the cathode, decreasing slightly to 1% with gold as the cathode. Injection and transport of holes in PPV is well known (A. R. Brown, et al., Chem. Phys. Lett., 1992, 200, 46–54), and it is believed that here the PPV acts primarily as a hole-transporting layer. It is believed that the efficiency improvement is due to confinement of charge carriers at the interface between the PPV and the CN-PPV due to differences in the energies of the HOMO and LUMO levels and the band offsets resulting at the interface between the two polymers.

One of the advantages of the condensation route to electron withdrawing group-substituted polymers is that a wide range of polymers and copolymers can be synthesised. The standard Wessling route to PPV polymers requires the intermediacy of a semi-stable quinoidal intermediate. This requirement may limit the range of monomers which can be employed. To exemplify the breadth of the condensation route and the range of colours that can be obtained from polymers produced by the condensation process, some examples are given below.

Alternative possible rates to these copolymers are: (1) Dehydrohalegenation of p-(bischloromethyl)cyano-methyl benzenes (see Hsieh, Polym. Mater. Sci. Eng., 1992, 67, 252) or NCCHBr-Ar-CHBrCN (see Chem. Abstr., 1985, 103, 178741a; 1987, 107, 237406c); (2) Wittig condensation polymerization described by the oligomer examples reported by Kossmehl and Nuck (Chem. Ber. 1979, 112, 2342).

In the present case, 4-(Methylmercapto)-phenol was alkylated with bromododecane to give (8), which was bischloromethylated (under forcing conditions) to yield (9). Treatment of (9) with sodium cyanide furnished the dinitrile (10). Copolymerisation of (10) and (7) (1:1) gave a red-orange copolymer (11) with bright orange fluorescence. The blue shift of this polymer as compared to that of (1) may be due to the greater ability of oxygen (compared to sulfur) to interact with the aromatic rings, thus lowering the HOMO-LUMO gap.

A two-layer device with structure ITO/PPV/(11)/Al was constructed and tested. It emitted a bright yellow-orange light with a maximum efficiency of 2%.

Alternatively, a copolymer based on the dialkoxynaphthalenediacetonitrile (14) was prepared. Bischloromethylation of the dialkoxynaphthalene (12) gave an unstable bischloromethyl substituted derivative, which upon attempted recrystallisation from methanol produced (13). Treatment of (13) with sodium iodide and boron trifluoride etherate gave a di-iodomethylnaphthalene, which converted into the nitrile (14) by an analogous method as previously described. A bright yellow fluorescent copolymer was produced from the cocondensation of (7) and (14). The blue shift of the absorbance of this last polymer [as compared with CN-PPV (1; $R=OC_6H_{13}$)] is probably due to the larger steric requirements of the naphthyl-group(peri-H), leading to greater twisting of the linking double bonds out of effective conjugation and shorter conjugation lengths, possibly as a result of crosslinking reactions. This device showed an efficiency of 2%.

Main chain polymers interrupted by regular cyano-substituted distyrylbenzene units can be produced by similar reaction sequences. The bis-aldehyde (15) was produced by the alkylation of p-hydroxybenzaldehyde with 1,8-dibromooctane. Condensation of (15) with (4) produced a bright yellow polymer (16).

Heterocycles can also be easily included in the copolymer chain. The literature records the preparation of an insoluble cyano-substituted alternating polymer derived from thiophene-2,5-diacetonitrile and thiophene-2,5-dicarboxaldehyde (Kossmehl, G. Ber. Bunsenges. Phys. Chem., 1979, 83, 417) and copolymers based on the thiophene-2,5-dicarboxaldehyde and 2,5-dimethoxyterephthaldehyde (H. H örhold, Z. Chem., 1972, 12). The bischloromethylation of 3-dodecylthiophene gave the unstable product (17), which was immediately treated with cyanide to give the bisnitrile (18). Alternatively, the bis-aldehyde (19) can be synthesized from (17) in 3 steps in an analogous fashion to before. Condensation of (18) with (7) gave a purple polymer (onset of absorbance of 670 nm).

Figure 11:
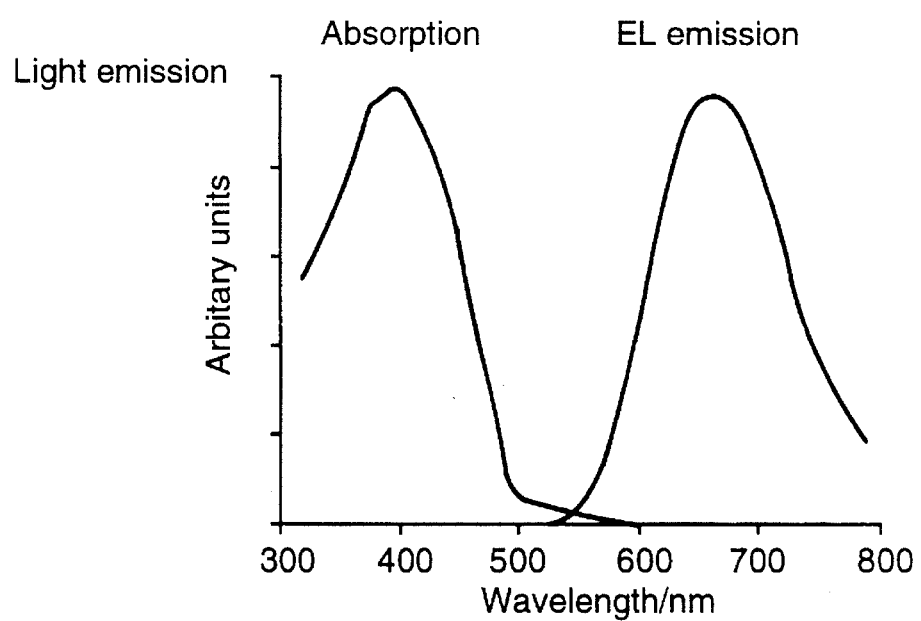
FIG. 11 shows absorption and EL emission spectra of a device comprising ITO/PPV/polymer (28)/Ca.
Figure 12:
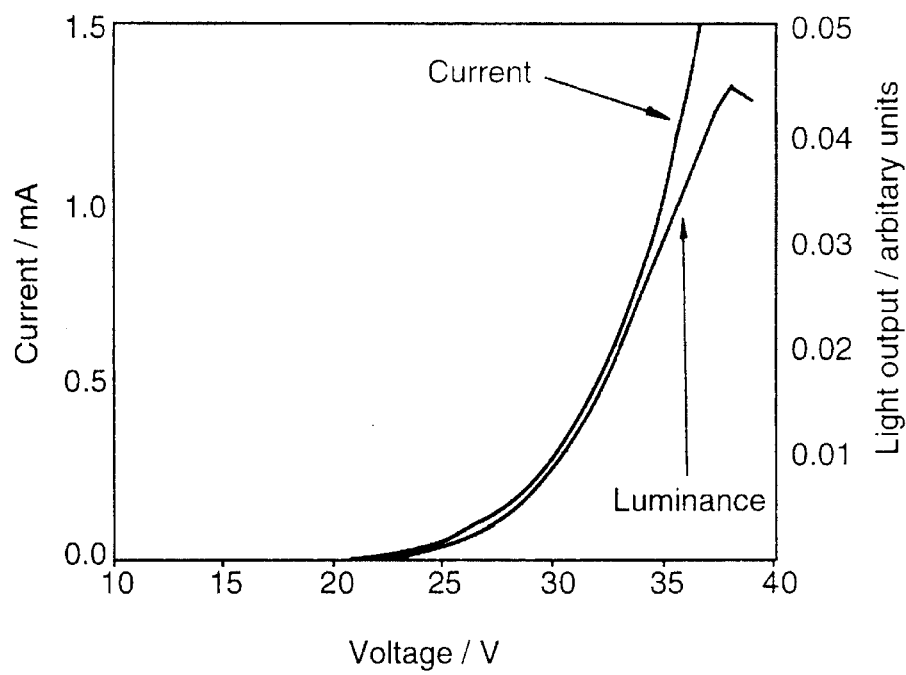
FIG. 12 shows a graph of current and luminance vs voltage for a device comprising ITO/PPV/polymer (28)/Ca.
Figure 13:
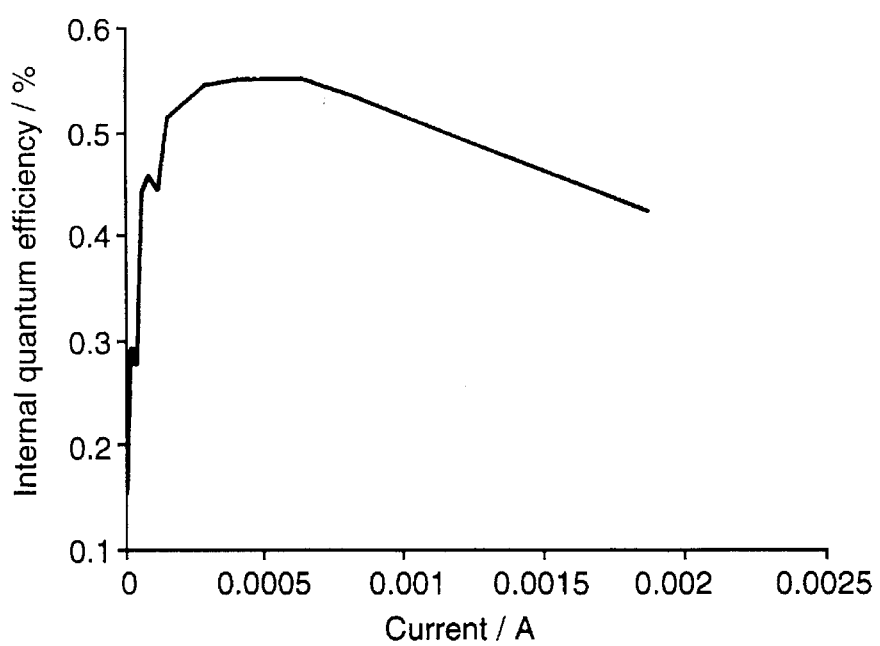
FIG. 13 shows a graph of quantum efficiency vs current for a device comprising ITO/PPV/polymer (28)/Ca.
Figure 14:
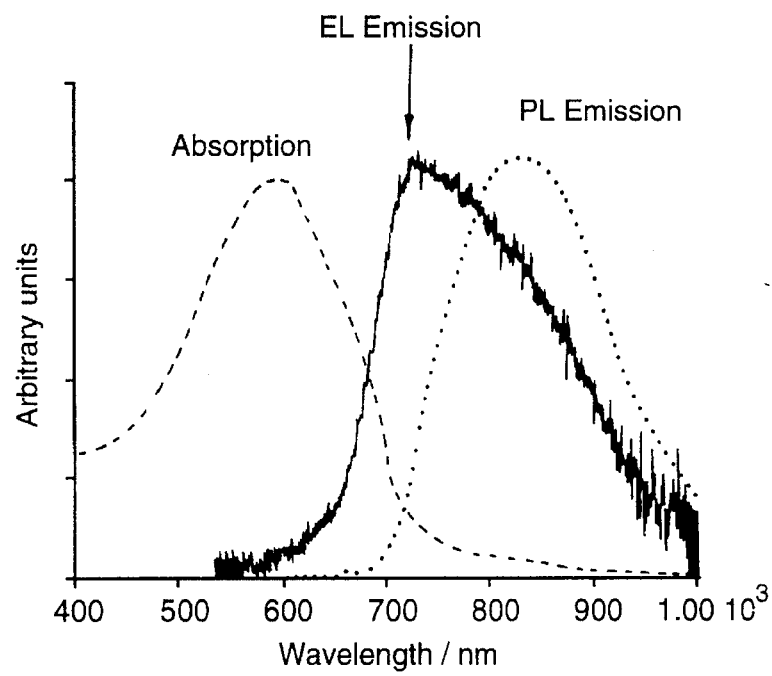
FIG. 14 shows absorption and PL emission spectra of polymer (21) and an EL emission spectrum for a device comprising ITO/PPV/polymer (21)/Ca.

It is possible to synthesise alternative polymers such as (28) by self-condensation of the monomer (33); however, the synthesis of (33) is harder and less efficient than the alternative syntheses of the dinitrile (4) and dialdehyde (7). This probably diminishes the attractiveness of this route. The absorption and EL emission spectra (FIG. 11), the current and luminance versus voltage (FIG. 12) and the efficiency versus current (FIG. 13) for polymer (28) are shown. EL emission from polymer (28) is less efficient than that from polymer (1; $R=OC_6H_{13}$) under comparable device conditions (see Example 2).

Device Preparation

EXAMPLE 1

Figure 4:
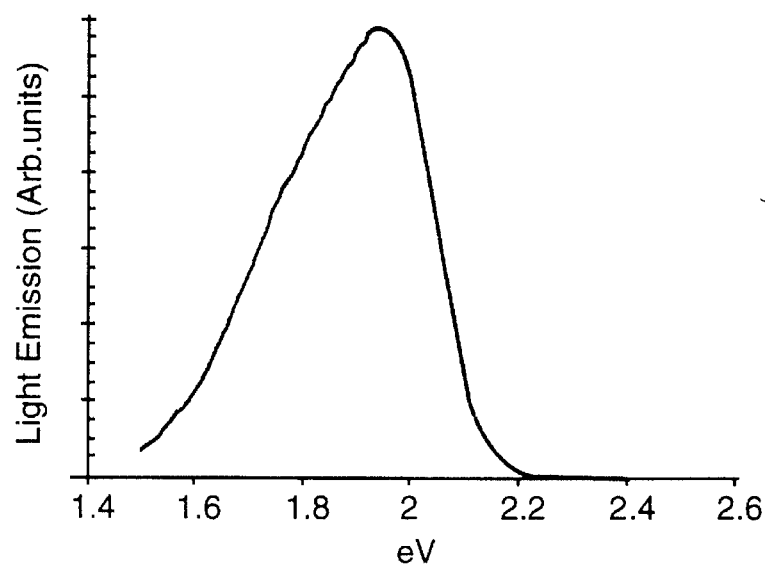
FIG. 4 shows an electroluminescence emission spectrum of CN-PPV (1)
Figure 5:
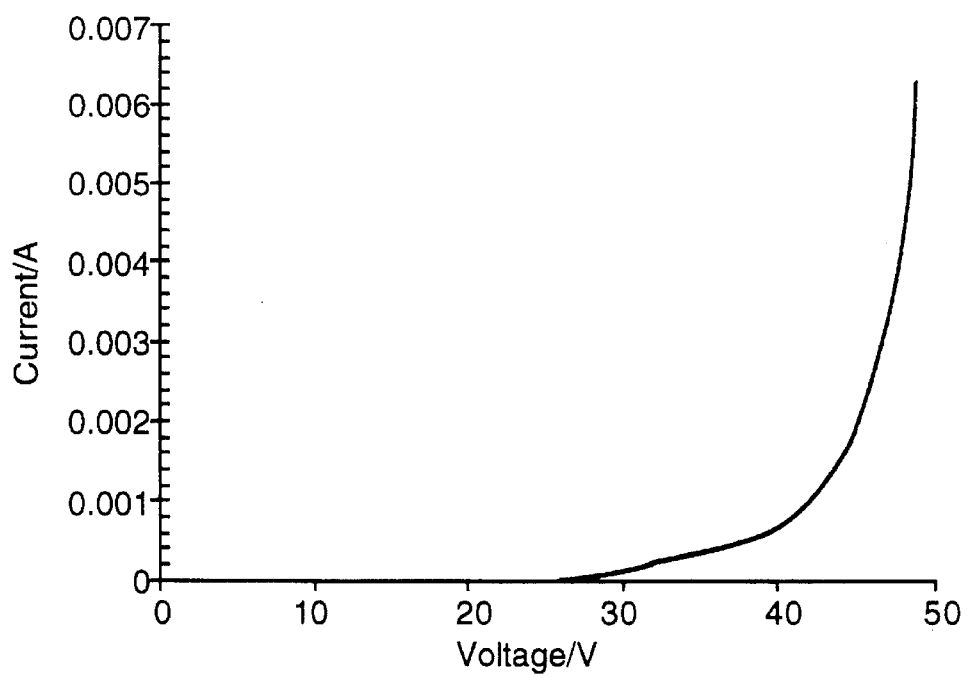
FIG. 5 shows a graph of voltage vs current for a device comprising ITO/CN-PPV/Al.
Figure 6:
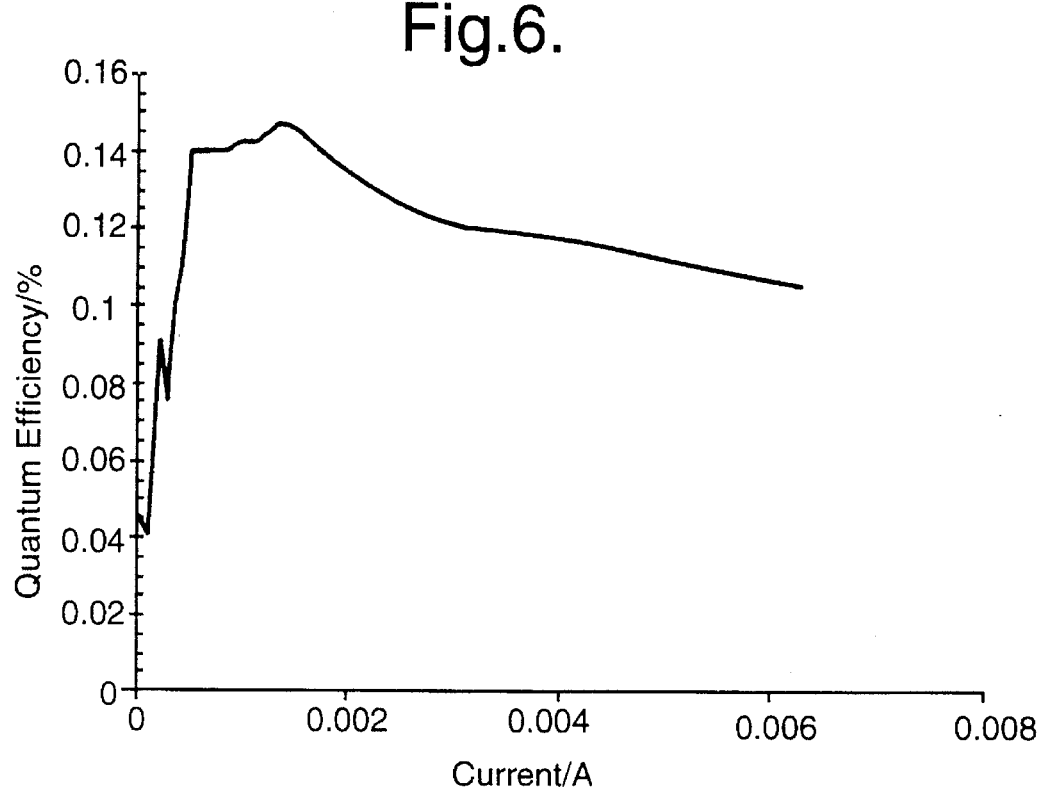
FIG. 6 shows a graph of efficiency vs current for a device comprising ITO/CN-PPV/Al.

CN-PPV(1;R=OC$_6$H$_{13}$) was spin-coated (using a Dynapert photoresist spin-coater) from chloroform solution at 2000 rpm onto an ITO-coated glass substrate to give a layer of polymer of thickness approximately 300 nm. An aluminium contact of area approximately 10 mm$^2$ was deposited by vacuum evaporation on top of the polymer layer. Contacts were made to the ITO and to the aluminium electrode and a positive bias was applied to the ITO. For voltages above 30 V, red light was observed to be emitted from the device. The spectrum of the electroluminescence is shown in FIG. 4. A typical current-voltage characteristic is shown in FIG. 5. The variation of efficiency with current is shown in FIG. 6. A maximum internal quantum efficiency of 0.3% was obtained. Brightnesses of over 10 cd/m$^2$ were obtained.

EXAMPLE 2

Figure 7:
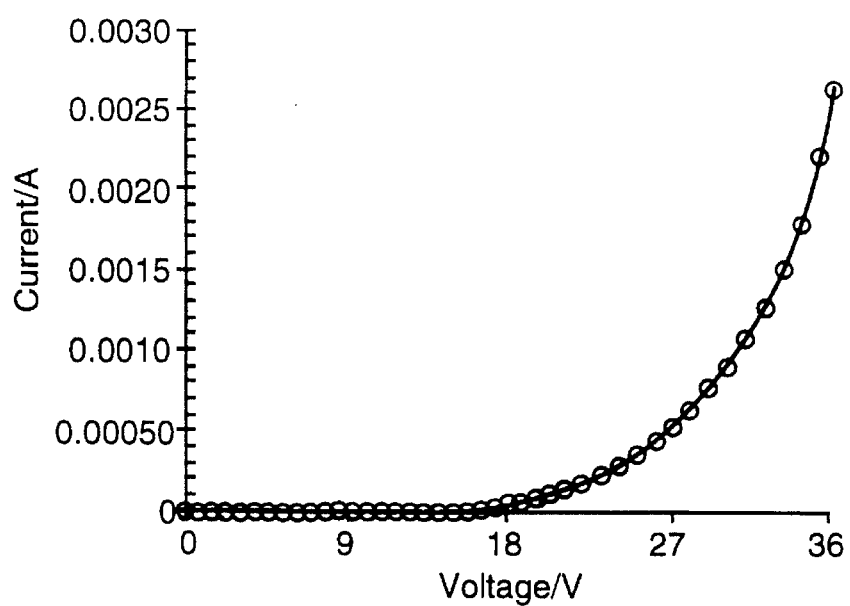
FIG. 7 shows a graph of voltage vs current for a device comprising ITO/PPV/CN-PPV/Al.
Figure 8:
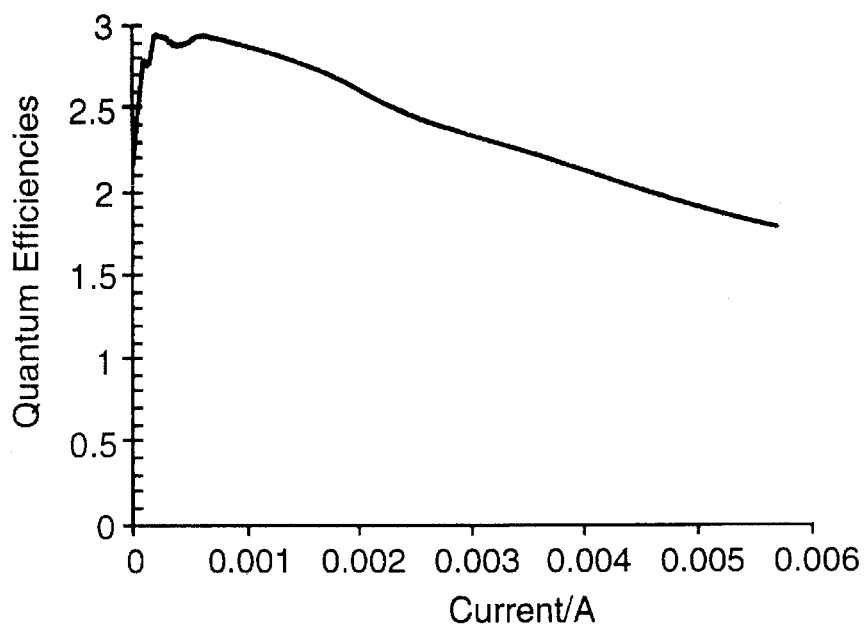
FIG. 8 shows a graph of efficiency vs current for a device comprising ITO/PPV/CN-PPV/Al.

THT leaving group precursor to PPV (P. L. Burn, et al., J. Chem. Soc., Perkin Trans. 1., 1992, 3225–3231) was spin coated at 2000 rpm onto an ITO-coated glass substrate. The film was heated at 220° C. for 12 hr to give a film of PPV thickness approximately 270 nm. CN-PPV (1;R=OC$_6$H$_{13}$) was then spin-coated on top of the PPV as described in Example 1. An aluminium contact of area approximately 10 mm$^2$ was deposited by vacuum evaporation on top of the polymer layer. Contacts were made to the ITO and to the aluminium electrode and a positive bias was applied to the ITO. For voltages above 15 V, red light was observed to be emitted from the device. The spectrum of the electroluminescence was similar to that obtained in Example 1. A typical current-voltage characteristic is shown in FIG. 7. The variation of efficiency with current of a typical device is shown in FIG. 8. Maximum internal quantum efficiencies of 3% were obtained. Brightnesses of over 150 cd/m$^2$ were obtained. A similar device using a calcium cathode had a maximum efficiency of 1.7%.

EXAMPLE 3

Figure 9:
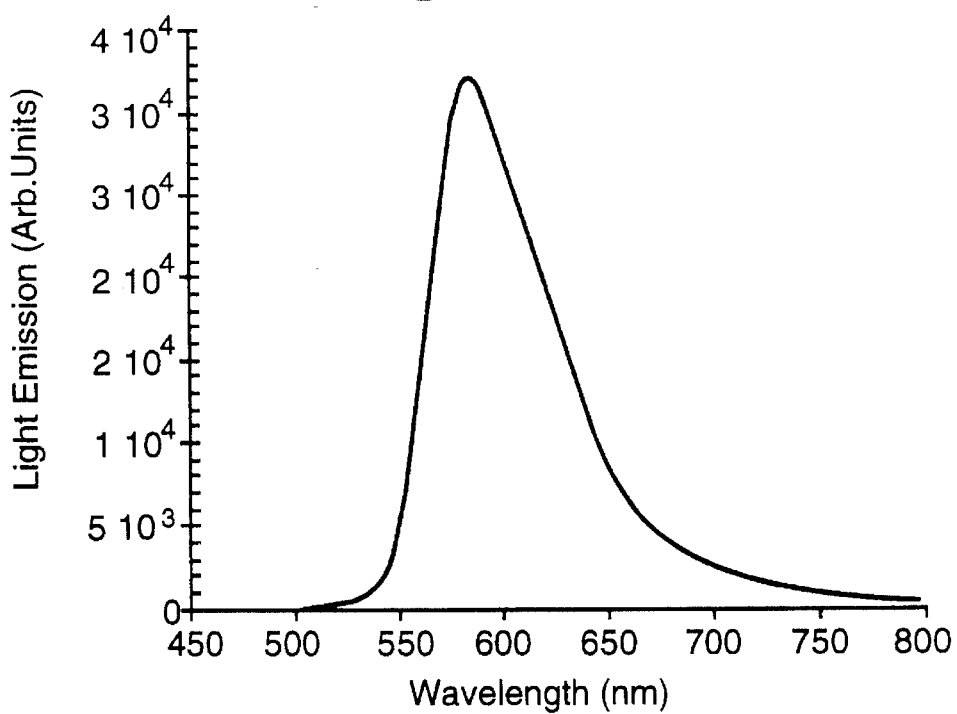
FIG. 9 shows an EL emission spectrum of a device comprising ITO/PPV/polymer(11)/Al.

Devices were made using polymer (11) (as described in Example 2). Maximum quantum efficiencies of 2.5% were found. The emission spectrum is shown in FIG. 9.

EXAMPLE 4

Figure 10:
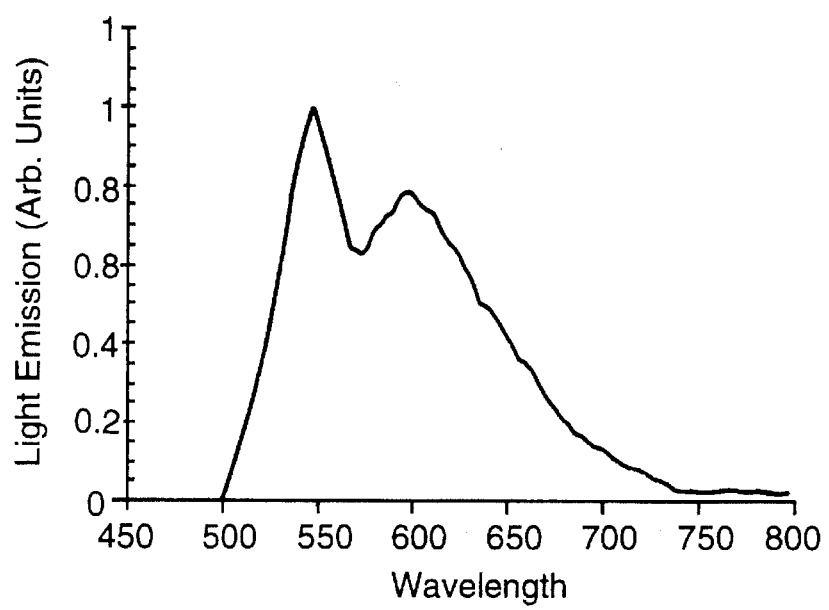
FIG. 10 shows an EL emission spectrum of a device comprising ITO/PPV/condensation polymer of (14)+(7)/Al.

Devices were made using the naphthalene polymer (as described in Example 2). Maximum quantum efficiencies of 2.0% were found. The emission spectrum is shown in FIG. 10.

EXAMPLE 5

Devices were made using polymer (28) (as described in Example 2). Maximum quantum efficiencies of 0.55% were found. The absorption and EL emission spectra (FIG. 11), the current and luminance versus voltage (FIG. 12) and the efficiency versus current (FIG. 13) for polymer (28) are shown.

EXAMPLE 6

Figure 15:
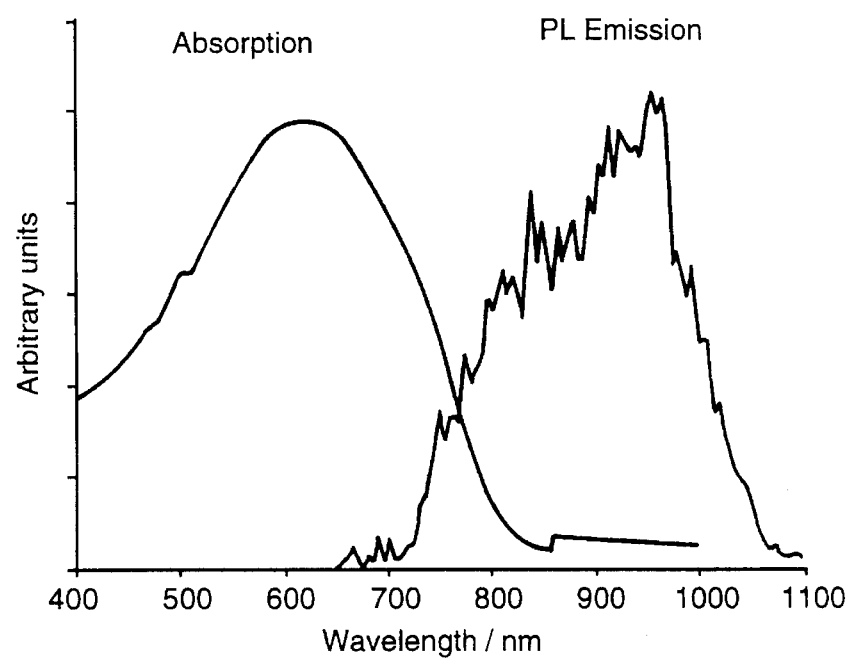
FIG. 15 shows absorption and PL emission spectra of polymer (22).

Devices were made using polymer (21) (as described in Example 2). Maximum quantum efficiencies of 0.2% were found. The absorption, PL and EL emission spectra (FIG. 15) are shown.

Exemplification 1 preparation of 1,4-dihexyloxy-2,5-benzenediacetonitrile (4)

A mixture of the dichloride (3) (9.55 g, 25.4 mmol), sodium cyanide (3 g, 52 mmol) in DMF (dry, 150 ml) was stirred at 60° C. for 5 h. Sodium hydroxide solution (0.1 M, 100 ml) was added to the cooled reaction mixture which was then extracted with ether (2×100 ml). The combined organic fractions were washed with water (2×50 ml), dried over MgSO$_4$, and the solvent was removed under reduced pressure. The resultant white solid was recrystallised twice from aqueous ethanol to yield (4) (7.42 g, 82%), m.p. 96°–7° C., (Found C 74.2H, 9.3, N 7.5% C$_{22}$H$_{32}$N$_2$O$_2$ requires C 74.2, H 9.1, N 7.5%); IR (KBr) $v_{max}$/cm$^{-1}$ 2344 m, 1518 s, 1427 s, 1224 s, 1032 s, 870 m, 757 m, 724 m; $^1$H NMR (400.1 MHz, CDCl$_3$) δ:0.89–1.7, (22H, m, alkyl), 3.68 (4H, s, CH$_2$CN), 3.95 (4H, t, J=7 Hz, CH$_2$O), 6.69 (2H, s, phenyl); $^{13}$C NMR. (100.6 MH$_z$, CDCl$_3$ δ: 14.0, 18.6, 22.6 c, 25.7, 29.2, 31.5, 68.9, 112.6, 117.9, 119.1, 150.0. m/z 356 (M, 20), 272(12), 188 (100).

Preparation of 1,4-dihexyloxy-2,5-his (acetoxymethyl)benzene (5)

A solution of dichloride (3) (25.0 g, 67 mmol), anhydrous sodium acetate (16.0 g, 0.19 mol), and acetic anhydride (10 ml) in glacial acetic acid (140 ml) was heated to 90° C. for 3 h. The cooled reaction mixture was poured into water (250 ml) and the white precipitate was filtered, washed with water, and dried. It was recrystallized (aqueous ethanol) to give (5) (27.2g, 96%), m.p. 67°–68° C., (Found C 68.2, 9.2%. C$_{24}$H$_{38}$O$_6$ requires C 68.2, 9.1%); IR (KBr) $v_{max}$/cm$^{-1}$ 3065 w, 1718 s, 1519 m, 1265 s, 1215 s, 1019 m, 878 m, $^1$H NMR (400.1 MHz, CDCl$^3$) δ:0.9–1.8 (22H, m, alkyl), 2.09 (6H, s, CH$_3$CO), 3.92 (4H, t, J=6 Hz), 5.13 (4H, s, CH$_2$OAc), 6.87 (2H, s, phenyl); $^{13}$C NMR (100.6 MHz, CDCl$_3$) δ: 13.9, 20.9, 22.5, 25.7, 29.2, 31.5, 61.6, 68.9, 113.7, 125.1, 150.7, 170.8. m/z (EI) 422 (M, 90), 278 (20), 194 (55), 152 (100).

Hydrolysis of the acetate (5)

A mixture of the diacetate (5) (22.0 g, 52 mmol) and sodium hydroxide (8.0 g) in ethanol (200ml) was stirred at room temperature. After 0.5 h the mixture cleared, but became cloudy after 1 h, and was stirred for 1 further hour. It was poured into water (200 ml), and the precipitated sol id was filtered, washed with water, and recrystallized (ethanol/water 80:20, 300 ml) to yield 1,4-dihexyloxy-2,5-benzenedimethanol (6) ( 15.1 g, 86%), 96°–98° C., (Found C 70.9, H 10.0%. C$_{20}$H$_{34}$O$_4$ requires C 71.0, H 9.9%); IR (KBr) $v_{max}$/cm$^{-1}$3310 m, 1508 m, 1205 s, 1036 s; $^1$H NMR (400.1 MHz, CDCl$_3$) δ0.6–1.5 (22H, m, alkyl), 3.63 (4H, t, J=6.5 Hz, CH$_2$OPh), 4.33 (4H, s, CH$_2$OH), 4.41 (2H, s, OH), 6.64 (2H, s, phenyl); $^{13}$C NMR (100.6 MHz, CDCl$_3$) δ13.2, 22.1, 25.3, 28.9, 31.1, 59.0, 68.3, 111.0, 128.5, 149.6; m/z (EI) 338 (M, 70), 180 (30), 152 (75).

Oxidation of the Diol (6)

A mixture of pyridinium chlorochromate (3.0 g, 14 mmol), diol (6) (2.0 g, 5.9 mmol) in dichloromethane (50 ml) was stirred for 8 h. Water (100 ml) and ether (100 ml) were added and the mixture was stirred vigorously for 1h. The organic fraction was separated and the aqueous phase extracted with ether (100 ml). The combined organic fractions were washed with aqueous HCl (1.0 mol/50 ml), water (2×100 ml), dried (MgSO$_4$), and the solvent removed in vacuo to leave a yellow solid. It was redissolved in dichloromethane and filtered through silica. The solvent was evaporated and the residue was recrystallized from hexane to yield 1,4-dihexyloxy-2,5-benzenedicarboxaldehyde (7) (1.85 g, 94%), m.p. 74.5°–76° C. (Found C. 72.0, H 9.2%. C$_{20}$H$_{30}$O$_4$ requires C 71.8, 9.1%); IR (KBr) $v_{max}$/cm$^{-1}$ 1678 s, 1421 s, 1209 s, 1131 m. 993 m, 689 s; $^1$H NMR (400 MHz, CDCl$_3$) $\delta$0.88–1.7 (22H, m, alkyl), 4.07 (4H, t, J=7 Hz, CH$_2$O), 7.41 (2H, s, phenyl), 10.50 (2H, s, CHO); $^{13}$C NMR (100.6 MHz, CDCl$_3$) $\delta$13.9, 22.5, 25.6, 28.9, 31.4, 69.1, 111.5, 129.1, 155.1, 189.3. m/z (EI) 334 (M, 18), 287 (10), 273 (100), 178 (63) 166 (80).

Condensation Polymerisation of (4) and (7)

A mixture of the dialdehyde (7) (0.188 g, 0.56 mmol) and the dinitrile (5) (0.200 g, 0.56 mmol) was stirred t-butanol (5 ml) and THF (5 ml) at 35° C. under argon until the solution cleared. Potassium t-butoxide (15 mg) was added, and the stirring continued at 35° C. for 1 h (a dark red solid formed after 30 min.). The cooled mixture was poured into methanol (30 ml), and the solid filtered, washed with methanol, and dried. It was redissolved in chloroform (10 ml) and precipitated with ethyl acetate (40 ml). The red product was filtered and dried to yield (1, R=OC$_6$H$_{13}$) (0.137 g, 38%), m.p. 115°–220° C., (Found C 75.9, H 8.9, N 3.9%. Polymer requires C 77.0, H 8.9, N 4.2%); $^1$H NMR (250.1 MHz, CDCl$_3$) $\delta$0.7–2.0 (22H, m, alkyl), 4.09 (4H, m, CH$_2$O), 7.16 (1H, s), 7.93 (1H, s), 8.10 (1H, s); IR (film) $v_{max}$/cm$^{-1}$ 2211 w, 1214 s, 1028 s, 864 m.

Examplification 2

Bischloromethylation of 1-dodecyloxy-4-methylthio-2,5-benzene (9)

A mixture of the thioether (9) (2.75 g) and paraformaldehyde (3.0 g) was stirred in a mixture of hydrochloric acid (33%, 8 ml) and p-dioxan (25 ml) at 0° C. while hydrogen chloride was bubbled through for 0.5 h. The temperature was raised to 80° C. and the mixture was vigorously stirred for 1 week. Ether (200 ml) was added to the cooled mixture which was then washed with water (3×200 ml), dried (Na$_2$SO$_4$), and evaporated to give an off-white solid. Recrystallisation from hexane yielded (9) m.p. 75°–76° C.; $v_{max}$ (KBr)/cm$^{-1}$ 1496 s, 1471 s, 1261 s, 1180 s; $^1$H NMR (250.1 MHz, CDCl$_3$) $\delta$0.89 (3H, t, J=7 HZ, CH$_3$—CH$_2$), 1.27 (20H, bs, alkyl), 1.84 (2H, q, J=7 Hz, CH$_2$CH$_2$—O), 2.46 3 (H, s. SMe), 4.03 (2H, t, j=6 Hz, CH$_2$—O), 4.62 and 4.78 (4H, 2s, CH$_2$Cl), 6.95 and 7.43 (2H, 2 s, Ar); $\delta_C$(100 MHz; CDCl$_3$) $\delta$14.8, 18.7, 22.6, 26.0, 29.1, 29.3, 29.5, 29.6, 31.9, 40.8, 44.5, 68.6, 113.3, 127.2, 128.0, 139.3, 155.9.

Synthesis of 1-dodecyloxy-4-methylthio-2,5-benzenediacetonitrile (10)

A mixture of the bis-chloromethyl compound (9) (3.4 g, 8.1 mmol) and sodium cyanide (0.98g, 20 mmol) in DMF (20 ml) was stirred at 50° C. for 3 h. The cooled mixture was poured into water (100 ml) and extracted with ethyl acetate (2×100 ml). The combined organic fractions were reduced in vacuo to leave a yellow oil. Hexane (50 ml) was added, and a creamy solid precipitated. The solid was filtered, washed with hexane to yield (10) (0.81 g, 35%), m.p. 100°–2° C. (Found M$^+$ 386.2399. C$_{23}$H$_{34}$N$_2$OS requires M 386.2393); $^1$H NMR (250.1 MHz, CDCl$_3$) $\delta$0.9–1.9 (23H, m, alkyl), 2.42 (3H, s, SMe), 3.66 and 3.93 (4H, 2s, CH$_2$CN), 4.01 (2H, t, J 7, CH2O), 6.97 and 7.41 (2H, 2 s, phenyl). $^{-}$C NMR (62.9 MHz, CDCl$_3$) $\delta$14.1, 18.4, 18.6, 22.4, 22.7, 26.0, 29.0, 29.1, 29.4, 29.60, 29.61, 29.65, 31.9, 68.8, 111.8, 117.5, 117.7, 119.8, 127.5, 131.7, 132.2, 155.5; IR (KBr) $v_{max}$/cm$^{-1}$ 2245 m, 1394 s, 1252 s, 1172 m, 1148 m. m/z 386 (M, 25%), 218 (100).

Polymerization of (10) and (7)

A mixture of the dinitrile (10) (0.10 g. 0.26 mmol) and the dialdehyde (7) ( 86 mg, 0.26 mmol) was stirred in t-butanol ( 10 ml ) at 50° C. Potassium t-butoxide (0.01 g) was added and the stirring was continued for 1 h at the same temperature, whereupon an orange solid precipitated out. Methanol (50 ml) was added to the cooled mixture, and the sol id was filtered, washed with methanol, and dried. It was redissolved in dichloromethane (10 ml) and precipitated with the addition of ethyl acetate (30 ml). The solid was filtered, washed with ethyl acetate and dried to give an orange solid (11) (124 mg, 71%), $^1$H NMR (250.1 MHz, CDCl$_3$) $\delta$: 0.7–1.8 (45H, m, alkyl), 2.51 (3 H, s, SMe), 4.12 (6H, bs, OCH$_2$), 7.02, 7.54, 7.79, 7.93, 7.97, 8.03 (6H, 6 s, aromatic); IR (KBr) $v_{max}$/cm$^{-1}$ 2206 m, 1427 s, 1217 s, 1027 m.

Exemplification 3

2,6-Dihexyloxy-naphthalene (12)

A solution of sodium (3.04 g, 132 mmol) in dry methanol (60 ml) was refluxed for 30 minutes and cooled. A solution of 2,6-naphthalenediol (9.0 g, 56.2 mmol) in dry methanol (40 ml) was added and the mixture refluxed for 30 minutes and cooled. 1-Bromohexane (17.5 ml, 125 mmol) was added and the reaction mixture was refluxed under an argon atmosphere for 19 h. The solvent was evaporated and ether (250 ml) was added. It was washed with aqueous sodium hydroxide solution (10%, 100 ml) and water (2×100 ml) to yield a dark brown solution. After refluxing with activated charcoal for 30 min and filtration, the solution was evaporated to yield an oil which was recrystallised from methanol (250 ml). The fine white platelets were collected at the pump and washed with a little cold methanol to give (12) (8.33 g). A recrystallisation gave more product (0.67 g, 49% total yield), m.p. 78.0°–79.0° C., R$_f$ 0.83 (dichloromethane), (Found: C, 80.7; H, 10.0; M$^+$, 328.2404) C$_{22}$H$_{32}$O$_2$ requires C, 80.4; H, 9.8; M, 328.2404); $v_{max}$ (KBr)/cm$^{-1}$ 3050 w, 2900 s, 2840 s, 1590 s, 1495 m, 1455 m, 1385 s, 1375 (s), 1225 s, 1165 s, 1110 s, 1070 s, 1045 s, 995 s, 965 s, 850 s; $^1$HNMR (400 MHz; CDCl$_3$) $\delta$0.93 (6H, t, J=6.8 Hz, —CH$_3$), 1.42–1.32 (8H, m, alkyl), 1.50 (4H, qn, J=7.3 Hz, OC$_2$H$_4$—CH$_2$), 1.84 (4H, qn, J=7.1 Hz, ArOCH$_2$—CH$_2$), 4.04 (4H, t, J=6.6 Hz, O—CH$_2$), 7.09 (2H, d, J=2.1 Hz Ar$_{1,5}$—H), 7.13 (2H, dd, J=8.8 Hz, 2.2, Ar$_{3,7}$—H), 7.62 (2H, d, J=8.9 Hz, Ar$_{4,8}$—H); $\delta_C$(100 MHz; CDCl$_3$) 14.1, 22.6, 25.8, 29.3, 31.6, 68.0, 106.9, 119.2, 128.0, 129.7, 155.5; m/z (EI) : 328 (M, 16%), 244 (13,M—C$_6$H$_{12}$), 160 (100,M-2C$_6$H$_{12}$), 131 (21), 55 (21).

1,5-Bis(methoxymethyl)-2,6-dihexyloxy-naphthalene (13)

Hydrogen chloride was bubbled through a stirred solution of formaldehyde (37% w/w; 25 ml, 270 mmol) and hydrochloric acid (37% w/w, 25 ml, 270 mmol) for 15 minutes. A solution of 2,6-dihexyloxynaphthalene (8.95 g, 27.2 mmol)

in 1,4-dioxane (140 ml) was added dropwise over 15 minutes with the gas flow continuing. A white precipitate appeared just before the end of the addition after 30 minutes. The gas was bubbled through for a further 90 minutes and the reaction stirred for 14 hours longer. The reaction mixture was filtered and the precipitate washed with water until the washings were no longer acidic (5×100 ml) (crude yield 22.5 g). The crude product was stirred in warm methanol (250 ml), the crystals collected at the pump and washed with some ice-cold methanol to yield fine white crystals of (13) (8.64 g, 81% yield). m.p. 103.0°–103.5° C., $R_f$ 0.37 dichloromethane), (Found: C, 75.04; H, 9.79; $M^+$ 416.2927. $C_{26}H_{40}O_4$ requires C, 74.96; H, 9.68%; M, 416.2927); $v_{max}$(KBr)/cm$^{-1}$ 1595(m), 1265(s), 1245(s), 1190(m), 1180(m), 1100(s), 1080(s), 935(m), 925(m), 805(m); $\delta_H$(250 MHz; CDCl$_3$) 0.91 (6H, t, J=7.0 Hz, —CH$_3$), 1.42–1.32 (8H, m, alkyl, 1.56–1.45 (4H, m, ArOC$_2$H$_4$—CH$_2$), 1.82 (4H, qn, J=5.6 Hz, OCH$_2$—CH$_2$), 3.39 (6H, s, O—CH$_3$), 4.08 (4H, t, J=6.5 Hz, ArO—CH$_2$—), 4.97 (4H, s, Ar—CH$_2$—), 7.28 (2H, d, J=9.3 Hz, ArH$_{4,8}$), 8.07 (2H, d, J=9.3 Hz, ArH$_{3,7}$); $\delta_C$ (63 MHz; CDCl$_3$) 13.8, 22.4, 25.6, 29.4, 31.4, 57.4, 64.3, 69.7, 115.6, 118.9, 125.8, 129.3, 153.4; m/z (EI): 416 ($M^+$, 55%), 300 (17, $M^+$—CH$_3$OC$_6$H$_{13}$), 243 (30), 226 (12), 199 (90, $M^+$—CH$_3$OC$_6$H$_{13}$, OC$_6$H$_{13}$), 184 (56, $M^+$—2CH$_3$OC$_6$H$_{13}$), 165 (100), 139 (12), 123 (10), 105 (13).

1,5-Bis(iodomethyl)-2,6-dihexyloxy-naphthalene

A mixture of the bismethoxy compound (12) (1.00 g, 2.40 mmol) and sodium iodide (719 mg, 4.80 mmol) in acetonitrile (19 ml) was stirred at 0° C. Boron trifluoride etherate (590 l, 4.80 mmol) was slowly added at this temperature and the reaction was left to stir for 24 hours at room temperature. Ethyl acetate (100 ml) was added and the crystals collected at the pump and washed with a little ice-cold solvent and dried in vacuo to yield yellow crystals (915 mg, 63%), m.p. 121.0°–121.5° C., $R_f$ 0.85 (dichloromethane), (Found: C, 47.5; H, 5.6. $C_{24}H_{34}O_2I_2$ requires C. 47.4; H, 5.6%); $v_{max}$(KBr)/cm$^{-1}$ 3030 w, 1580 m, 1250 s, 1180 s, 1180 s, 1140 s, 1115 s, 1110 s, 1075 s, 1045 s, 800 s, 705 m; $\delta_H$(250 MHz; CDCl$_3$) 7.93 (2H, d, J=9.3 Hz, ArH$_{3,7}$), 7.30 (2H, d, J=9.3 Hz, ArH$_{4,8}$), 4.94 (4H, s, CH$_2$—I), 4.17 (4H, t, J=6.4 Hz, O—CH$_2$), 1.88 (4H, qn, J=6.9 Hz, OCH$_2$—CH$_2$—), 1.59–1.50 and 1.43–1.35 (6H, br m, alkyl), 0.92 (6H, t, J=7.0 Hz, CH$_2$CH$_3$); $\delta_C$(100 MHz; CDCl$_3$) 152.6, 127.4, 124.7, 120.0, 115.0, 69.1, 57.4, 31.6, 29.6, 25.8, 22.6, 14.1, −1.3.

Preparation of 2,6-dihexyloxy-1,5-naphthalenediacetonitrile (14)

A mixture of 1,5-bis(iodomethyl)-2,6-dihexyloxynaphthalene (0.50 g, 0.83 mmol) and sodium cyanide (0.16 1.74 mmol) was stirred in DMF (50 ml) at 55° C. for 1 g, h. Water (50 ml) was added to the cooled mixture and the resulting precipitate was filtered, washed with water and dried. It was redissolved in a minimum of dichloromethane, hexane (40 ml) was added, and the solution was cooled to −4° C. overnight. The product was filtered to yield (14) (0.21 g, 63%), m.p. 135°–6° C.; $^1$H NMR (250.1 MHz, CDCl$_3$) $\delta$0.9–1.9 (22H, m, alkyl), 4.11 (4H, s, CH$_2$CN), 4.14 (3H, t, J=7 Hz, CH$_2$O), 7.35 and 7.88 (2H, 2d, J- 10 Hz, aromatic); $^{13}$C NMR. (62.9 Mhz, CDCl$_3$) $\delta$13.5, 14.2, 22.8, 25.9, 29.6, 31.7, 69.8, 112.2, 115.8, 118.3, 121.5, 127.9, 152.9; IR (KBr) $v_{max}$/cm$^{-1}$ 2248 w, 1598 s, 1261 s, 1067 s, 802 m. m/z 406 (M, 28), 238 (100), 91 (95).

Condensation polymerisation of (14) and (7)

A solution of the dinitrile (14) (0.12 g, 0.295 mmol) and the dialdehyde (7) (98 mg, 0.295 mmol) in t-butanol (15 ml) was stirred at 50° C. when potassium t-butoxide (10 mg) was added. Stirring was continued for 1.5 h at the same temperature, when a further 10 mg of base was added. After a total of 4 h at 60° C., methanol was added to the cooled red solution, and the yellow precipitate was filtered, washed with methanol, and dried to yield a yellow solid (15) (82 mg, 39%), $^1$H NMR (250.1 MHz, CDCl$_3$) $\delta$: 0.6–2.8 (m, alkyl), 4.13 (bs, CH$_2$O), 6.2–8.1 (m, aromatic); IR (KBr) $v_{max}$/cm$^{-1}$ 2207 m, 1587 m 1423 m, 1209 m, 813 m.

Exemplification 4

Preparation of 1,8-bis-(4-formyl(phenoxy)octane (15)

A mixture of 1,8-dibromooctane (8.0 g, 29.5 mmol), p-hydroxy-benzaldehyde (7.2 g, 59 mmol) and potassium carbonate (8.2 g, 6.0 mmol) in DMF (50 ml) was heated to 55° C. with stirring for 8 h. The cooled solution was poured into water and the precipitate was filtered, washed with water, and dried. Recrystallisation from hot ethanol (200 ml) yielded (15) (7.72 g, 73%), m.p. 89° C.–91° C., (Found C. 74.4, H 7.4 %. $C_{22}H_{26}O_4$ requires C 74.5, H 7.4 %), $^1$H NMR (250.1 MHz, CDCl$_3$) $\delta$: 1.3–1.9(12H, m, alkyl), 4.02(4H, t, J=7 Hz, CH$_2$O), 6.97 and 7.81 (8 H, 2 d, J=11 Hz, aromatic), 9.85 (2H, s, CHO); IR (KBr) $v_{max}$/cm$^{-1}$ 1698 s, 1598 s, 1156 s, 834 s. m/z 354 (M, 45), 326 (30), 233 (15), 121 (55), 69 (100).

Exemplification 5

Preparation of Polymer (20)

A solution of the dinitrile (18) (0.138 g, 0.448 mmol) and the dialdehyde (7) (0.159 mg, 0.448 mmol) in t-butanol (12 ml) was stirred at 60° C. when potassium t-butoxide (20 mg) was added. Stirring was continued for 0.5 h at the same temperature, when a dark solid precipitated out. Methanol (100 ml) was added to the cooled solution, and the violet precipitate was filtered, and dried. It was redissolved in a minimum of chloroform (ca. 5 ml) and reprecipitated with methanol (60 ml) to give (20) (91 mg, 33%), $^1$H NMR (250.1 MHz, CDCl$_3$) $\delta$; 0.8–2.0 (m, alkyl), 2.78 and 3.0 (2 t, 4.13 (bs, CH$_2$-thiophene) , 4.10 (m, CH$_2$O), 6.9–9.2 (m, aromatic); IR (KBr) $v_{max}$/cm$^{-1}$ 2206 m, 1216 s, 1026 m, 856 m.

Exemplification 6

1-Chloromethyl-2,5-dihexyloxy-4-benzenemethanol (31)

A mixture of the diol (6) (8.2 g, 24.3 mmol), hexane (60 ml), petroleum ether ((60/40), 20 ml)) and conc HCl (150 ml) was heated to 60°–65° C. while stirring vigorously. As soon as all the solid dissolved the reaction was cooled, and hexane (100 ml) was added. The organic fraction was separated, washed with water (2×100 ml), dried (Na$_2$SO$_4$) and concentrated in vacuo. The oil was disolved in hexane (50 ml) and cooled to −4° C., whereupon a white solid crystallised out. The solid was filtered, and recrystallised from hexane in an analogous fashion to yield (31) as a white solid (2.3 g, 26%), $v_{max}$ (KBr)/ cm$^{-1}$ 3325 m, 1510 s 1420 s, 1213 s, 1034 s, 1000 s, 747 m, 668 m; $\delta_H$ (250.1 MHz; CDCl$_3$) 0.9–1.9 (22H, m), 2.2 (1H, bs), 3.96 (6H, t J=7), 4.62 (2H, s), 4.63 (2H, s), 6.85 (1H, s), 6.87 (1H, s); $\delta_C$ (62.9 MHz; CDCl$_3$) 14.2, 22.7, 25.9, 29.5, 31.7, 41.7, 62.1, 68.9, 69.4, 113.1, 113.8, 125.7, 130.7, 150.6, 150.9, m/z (CI) 356(M$^+$, 10), 339 (55), 321 (100), 305 (40) [exact mass (M$^+$; CI) 356.211, C$_{20}$H$_{33}$O$_3$Cl requires 356.211].

2,5-Dihexyloxy-4-(hydroxymethyl)-benzeneacetonitrile (32)

A solution of the chloride (31) (1.52 g) and sodium cyanide (0.22 g) in DMF (50 ml) was stirred at 60° C. for 3 h. It was poured into water (100ml), and extracted with ether -hexane ( 1:1, 150 ml ). The organic fraction was washed with water, dried (MgSO$_4$) and the solvent evaporated to give an oil, which was crystallised from hexane (80 ml) to give (32), (1.31 g, 88%), as needles, m.p 63°–66° C., [Found C. 73.0, 9.7, N 3.8, C$_{21}$H$_{33}$NO$_3$ requires C 72.6, 9.6, N 4.0%]; $\nu_{max}$ (KBr)/cm$^{-1}$ 3334 m, 2250 m, 1511 s, 1425 s, 1395 s, 1216 s, 1192 s, 1034 s, 998 s, 871 m, 724 m; $\delta_H$ (250.1 MHZ; CDCl$_3$) 0.9–1.9 (22H, m), 4.36 (4H, m), 2.42 (1H, t, J=5), 3.68 (2H, s), 4.66 (2H, d, J=5), 6.84 (1H, s), 6.89 (1H, s); $\delta C$ (62.9 MHz; CDCl$_3$) 14.1, 18.7, 22.7, 25.9, 29.4, 31.7, 62.0, 69.1, 112.4, 112.7, 118.3, 130.2, 150.2, 150.7, m/z (CI) 347 (M$^+$, 43), 330 (100), 263 (5).

2,5-Dihexyloxy-3-formylbenzeneacetonitrile (33)

A mixture of the alcohol (32) (1.15 g) and pyridinium chlorochromate (PCC) (0.75 g) in dichloromethane was stirred for 2 h. A further portion of PCC (0.5 g) was added and stirring continued for 1 h. The mixture was poured into water and extracted with ether (120 ml). The organic fraction was washed with water, and the solvent removed in vacuo to give an oil. Chromatography on silica followed by two recrystallisations from hexane gave (33) as a white solid, $\nu_{max}$ (KBr)/ cm$^{-1}$ 2245 w, 1677 s, 1614 m, 1500 s, 1428 s, 1390 s, 1204 s, 1069 m, 693 m. $\delta_H$ (250.1 MHz; CDCl$_3$) 0.9–1.9 (22H, m), 3.73, (2H, 2), 3.98 (2H, t, J=7), 4.06 (2H, t, J=7), 6.97 (1H, s), 7.27 (1H, s); $\delta C$. (62.9 MHz; CDCl$_3$) 14.1, 19.5, 22.7, 25.8, 29.2, 31.6, 69.0, 69.6, 109.2, 114.3, 117.4, 125.0, 127.1, 150.2, 156.2, 189.2; m/z (CI) 346 (M$^+$, 40), 238 (100). [Exact mass (M$^+$; CI) 346.238, C$_{21}$H$_{32}$O$_3$N requires 346.238].

Further in accordance with the present invention, the arylene units may be selected to modulate the optical properties of the polymer, particularly by modulation of the semiconductor band gap of the polymer. For example, different arylene units may be selected so as to modulate the optical properties of the polymer so that electroluminescent emission can be made to occur in the infrared region of the spectrum, preferably in the region 700 nm to 1100 nm. Polymers 21 and 22 are capable of emitting in the infrared region.

By selection of the arylene units in the polymer it is also possible to alter the conjugation length in the polymer so as to modulate the optical properties of the polymer. For example, it is possible to modulate the optical properties to obtain electroluminescent emission in the blue region of the visible spectrum, for example in the region 400 to 510 nm, advantageously 430 to 480 nm, preferably around 450 nm. This is exemplified by polymer 29 in which interruption of the conjugation is achieved by selection of isopropyl substituents on one ring to give rise to steric deformation or twisting, and selection of meta substitution on another aryl fragment.

The following general procedure for the preparation of polymers 20 to 30 is based on the methods described in the preceding exemplifications.

An equimolar mixture of the aryldialdehyde (ca. 100 mg) and the aryldiacetonitrile was dissolved in a mixture of t-butanol (2 ml) and tetrahydrofuran (2 ml). The reaction mixture was stirred and heated to 50° C. and tetra-n-butylammonium hydroxide (5 wt %) and potassium t-butoxide (5 wt %) was added. The reaction mixture was stirred for between 15 min to 2 h, then it was cooled and poured into methanol containing acetic acid. The precipitate was filtered, washed with methanol, dissolved in chloroform, and the product was reprecipitated from methanol. The polymer was then isolated by filtration and was dried in vacuo. Yields averaged 50–70%. Number average molecular weights ranged from 1110 to 10,200. The number average molecular weights, UV/VIS absorption maxima and optical band gap of each polymer are summarised in the following Tables 1 and 2.

TABLE 1

| | $M_n$ | $\lambda_{max}$/nm | $E_{opt}$/eV | Notes |
|---|---|---|---|---|
| 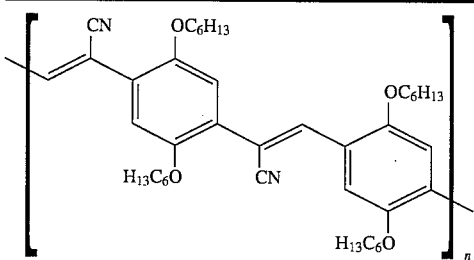 | 10500 | 496 | 2.05 | v. fluor. red |

1; R = C$_6$H$_{13}$

TABLE 1-continued
| | $M_n$ | $\lambda_{max}$/nm | $E_{opt}$/eV | Notes |
|---|---|---|---|---|
| 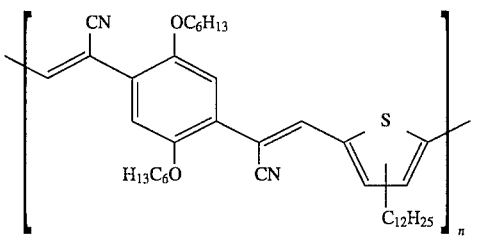 (20) | 3840 | 546 | 1.83 | purple |
| 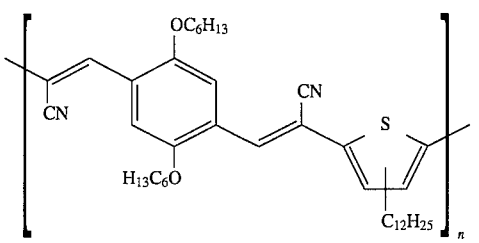 (21) | 2700 | 556 | 1.72 | purple |
| 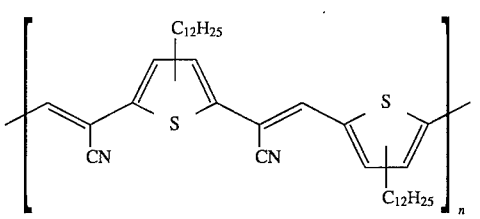 (22) | 1100 | 615 | 1.56 | dark blue |
| 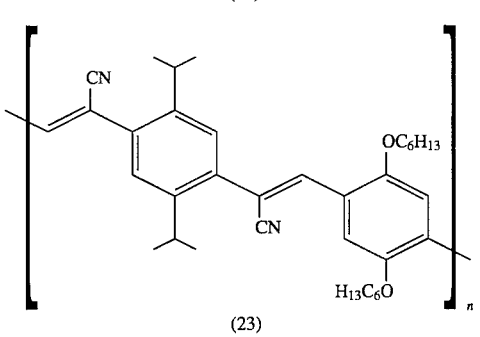 (23) | 11200 | 327 413 | 2.69 | yellow v. fluor. |
| 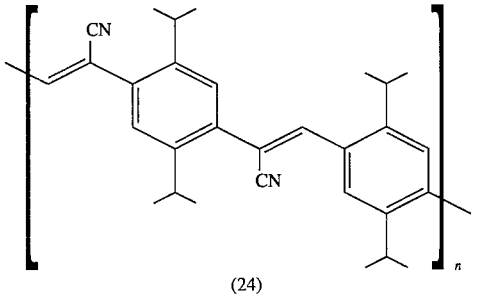 (24) | — | 328 | 3.15 | colourless non-fluor. |

TABLE 2
| | $M_n$ | $\lambda_{max}$/nm | $E_{opt}$/eV | Notes |
|---|---|---|---|---|
| 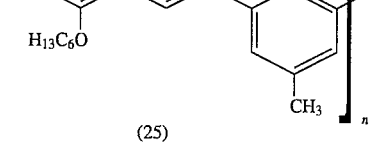 (25) | 5800 | 423<br>341 | 2.48 | yellow<br>v. fluor. |
| 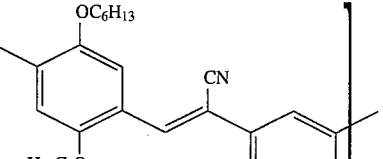 (26) | 10900 | 469<br>367 | 2.26 | yellow<br>v. fluor. |
| 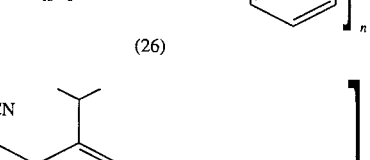 (27) | 10070 | 291 | 3.23 | colourless<br>faint blue fluor. |
| 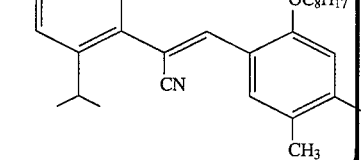 (28) | 4400 | 442 | 2.18 | red-orange<br>v. fluor. |
| 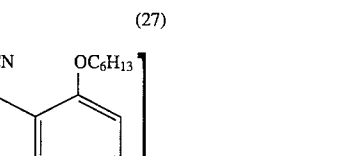 (11) | 10600 | 470<br>345 | 2.26 | orange<br>v. fluor. |
| 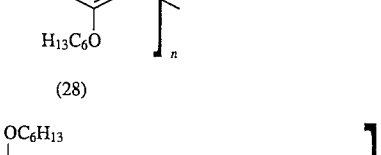 (29) | 14200 | 352 | 2.87 | sl. yellow<br>blue-green fluor. |

TABLE 2-continued

| | $M_n$ | $\lambda_{max}$/nm | $E_{opt}$/eV | Notes |
|---|---|---|---|---|
| 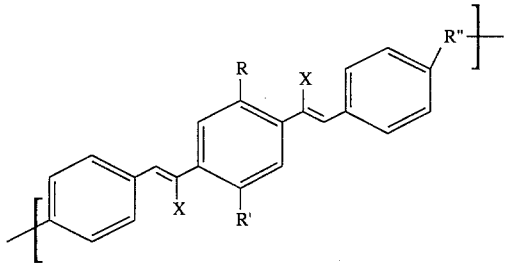 | 6200 | 338 | 2.93 | red, v fluor. |

We claim:

1. A semiconductive conjugated polymer comprising arylene vinylene units forming at least part of the polymer main chain in which a solubilising group is present on at least some of the arylene moieties so as to render the polymer solution processible, and an electron-withdrawing group is conjugatively linked to the polymer main chain, wherein the solubilising group and the electron-withdrawing group are selected so that the polymer exhibits electroluminescence upon application of an electric field to a layer thereof.

2. A semiconductive conjugated polymer according to claim 1, wherein the electron-withdrawing group is conjugatively linked to at least some of the vinylene moieties.

3. A semiconductive conjugated polymer according to claim 1, wherein the electron-withdrawing group is selected to modulate the optical properties of the polymer.

4. A semiconductive conjugated polymer according to claim 3, wherein the electron-withdrawing group is selected to modulate the wavelength of radiation emitted in electroluminescence.

5. A semiconductive conjugated polymer according to claim 1, wherein the electron-withdrawing group comprises a nitrile group, an ester group, an acid amide, a sulfone, a sulfoxide, a trifluoromethyl or a ketone group.

6. A semiconductive conjugated polymer according to claim 1, wherein the solubilising group comprises an alkoxy or alkyl group with 4 or more carbon atoms.

7. A semiconductive conjugated polymer according to claim 1, wherein the polymer is a substantially fully conjugated poly(arylene vinylene) polymer.

8. A semiconductive conjugated polymer according to claim 7, having the following general formula:

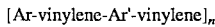

[Ar-vinylene-Ar'-vinylene]$_n$ in which Ar and Ar' are the same or different and represent arylene groups, each vinylene is substituted with the electron withdrawing group X, and n represents the degree of polymerisation.

9. A semiconductive conjugated polymer, having the general formula:

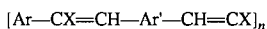

[Ar—CX=CH—Ar'—CH=CX]$_n$ wherein Ar and Ar' are the same or different and represent arylene groups, each vinylene is substituted with an electron withdrawing group X, n represents the degree of polymerisation and a solubilising group is present on at least some of the arylene groups so as to render the polymer solution processible; and wherein the polymer exhibits electroluminscence upon application of an electric field to a layer thereof.

10. A semiconductive conjugated polymer according to claim 9, wherein Ar and Ar' are both 2,5 dihexyloxy phenylene moieties and X is CN.

11. A semiconductive conjugated polymer according to claim 9, wherein Ar is 2-dodecyloxy,5-methylthio phenylene, Ar' is 2,5 dihexyloxy phenylene, and X is CN.

12. A semiconductive conjugated polymer according to claim 9, wherein Ar is 2,6-dihexyloxy naphthalene and Ar' is 2,5 dihexyloxy phenylene.

13. A semiconductive conjugated polymer according to claim 9, wherein Ar is a 2,5 dihexyloxy phenylene and Ar' is a dodecyl-substituted thiophene.

14. A semiconductive conjugated polymer comprising:

(i) conjugated regions incorporating arylene vinylene units forming part of the polymer main chain in which a solubilising group is present on at least some of the arylene moieties so as to render the polymer solution processible, and an electron-withdrawing group is conjugatively linked to the polymer main chain; and (ii) unconjugated regions, wherein the solubilising group and the electron-withdrawing group are selected so that the polymer exhibits electroluminescence upon application of an electric field to a layer thereof.

15. A semiconductive conjugated polymer according to claim 14, wherein the conjugated regions comprise distyrylbenzene moieties which incorporate the arylene vinylene units.

16. A semiconductive conjugated polymer according claim 15, having the following general formula:

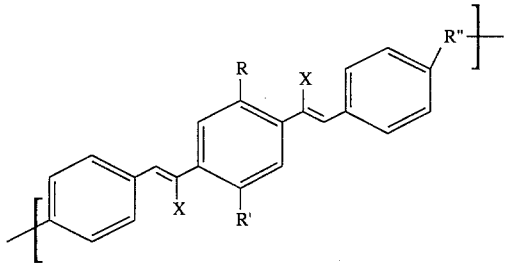

in which at least one of R and R' is a solubilising group, X is the electron-withdrawing group, and R" is an aliphatic linker group.

17. A semiconductive conjugated polymer according to claim 16, wherein R and R' are both hexyloxy groups, X is CN and R" is —O—(CH$_2$)$_8$—O—.

18. A method of making a semiconductive conjugated polymer according to claim 1, which method comprises reacting a first compound of general formula X—CH$_2$—Ar—CH$_2$—X with a second compound of general formula ORC—Ar'—CRO under conditions to produce a polymer comprising at least some regions of —Ar—CX=RC—Ar'—CR=CX— in which Ar and Ar' are the same or different and represent arylene moieties or arylene containing moieties, at least some of which are substituted with a solubilising group, X is an electron-withdrawing group and R is alkyl, aryl or hydrogen.

19. A method according to claim 18, wherein the reaction is performed under base catalysis.

20. A method according to claim 19, wherein the base is selected from potassium t-butoxide, tetra-N-butylammonium hydroxide and mixtures thereof.

21. A method according to claim 18, which is performed in the presence of t-butyl alcohol, and/or THF as solvent components.

22. A method according to claim 18, which is performed in the temperature range 20° to 60° C.

23. A method according to claim 18, wherein R is hydrogen.

24. A method according to claim 18, wherein X comprises a nitrile group, an ester group, an acid amide, a sulfone, a sulfoxide, a trifluoromethyl or a ketone group.

25. A method according to claim 18, wherein the solubilising group comprises an alkoxy or alkyl group with 4 or more carbon atoms.

26. A method according to claim 18, wherein Ar and Ar' are both 2,5-dihexyloxyphenylene moieties and X is CN.

27. A method according to claim 18, wherein Ar 2-dodecyloxy,5-methylthio phenylene, Ar' is 2,5 dihexyloxy phenylene, and X is CN.

28. A method according to claim 18, wherein Ar is 2,6-dihexyloxynaphthylene and Ar' is 2,5 dihexyloxy phenylene.

29. A method according to claim 18, wherein Ar is a 2,5 dihexyloxy phenylene and Ar' is a dodecyl-substituted thiophene.

30. A method according to claim 18, wherein Ar' comprises the unit Ar"-R"-Ar"' in which Ar" and Ar"' are the same or different and represent arylene moieties, and R" represents an aliphatic linker group.

31. A method according to claim 30, wherein Ar" and Ar"' are both p phenylene, X is CN and R" is —O—(CH$_2$)$_8$—O—.

32. An electroluminescent device comprising a semiconductive layer which comprises an emissive layer of semiconductive conjugated polymer, a first contact layer in contact with a first surface of the semiconductive layer, and a second contact layer in contact with a second surface of the semiconductor layer, wherein the polymer comprises arylene vinylene units forming at least part of the polymer main chain, on which is present a solubilising group so as to render the polymer solution processible, and an electron-withdrawing group is conJugatively linked to the polymer main chain, wherein the solubilising group and the electron-withdrawing group are selected so that the polymer emits radiation upon application of an electric field between the first and second contact layers.

33. An electroluminescent device according to claim 32, wherein the semiconductive conjugated polymer is as defined for claim 1.

34. An electroluminescent device according to claim 32, wherein the semiconductive conjugated polymer is as defined for claim 9.

35. An electroluminescent device according to claim 32, wherein the semiconductive conjugated polymer is as defined for claim 14.

36. An electroluminescent device according to claim 32, wherein the semiconductive layer further comprises a hole-transporting polymer layer between the emissive layer and the first contact layer, which hole-transporting polymer layer matches the first contact layer for hole injection.

37. An electroluminescent device according to claim 36, wherein the first contact layer comprises indium-tin oxide and the hole transporting polymer comprises poly(paraphenylenevinylene), polythiophene or polyphenylene.

38. An electroluminescent device according to claim 32, wherein the second contact layer comprises a metal selected from calcium, aluminium and gold.

39. An electroluminescent device according to claim 38, wherein the second contact layer comprises aluminum.

* * * * *

UNITED STATES PATENT AND TRADEMARK OFFICE
CERTIFICATE OF CORRECTION

PATENT NO. : 5,514,878
DATED : May 7, 1996
INVENTOR(S) : Holmes et al.

It is certified that error appears in the above-indentified patent and that said Letters Patent is hereby corrected as shown below:

In column 1, line 11, "d-c" should be --dc--; in line 22, "47" should read --347--; in line 66, "The" starts a new paragraph.

In column 2, line 25, "-" should be --.--.

In column 3, line 20, "naphthylene" should be --naphthalene--.

In column 7, line 14, insert --chromatography (GPC) (polystyrene standards) indicating a-- after the word "gel-permeation"; in line 15, delete "chromatography (GPC) (polystyrene standards) indicating a" after the word "$M_w$".

In column 8, line 53, delete "to before" after the word "fashion".

In column 10, line 3, "preparation" should be --Preparation--; in line 14, "C74.2H,9.3," should be --C74.2,H9.3,--; in line 19, "$MH_z$" should be --MHz--; in line 23, "2,5-his" should be --2,5-bis--; in line 33, insert --H-- after the numeral "68.2,"; in lines 48 and 49, "sol id" should be --sol-id--; in line 52, insert --m.p.-- after the numeral "86%),".

In column 11, line 9, "9.1%" should be --H9.1%--; in line 19, insert --in-- after the word "stirred"; in line 51, "t,j" should be --t,J--.

In column 12, line 5, "¯C NMR" should be --$^{13}$C NMR--; in line 17, "sol id" should be --solid--.

UNITED STATES PATENT AND TRADEMARK OFFICE
CERTIFICATE OF CORRECTION

PATENT NO. : 5,514,878
DATED : May 7, 1996
INVENTOR(S) : Holmes et al.

It is certified that error appears in the above-indentified patent and that said Letters Patent is hereby corrected as shown below:

In column 13, line 54, insert --g,-- after the numeral "(0.16"; in line 55, "1g,h." should be --1 h.--; in line 64, "Mhz" should be --MHz--.

In column 15, line 16, "73.0,9.7" should be --73.0 H9.7-- and "72.6,9.6" should be --72.6 H9.6--; in line 19, "MhZ" should be --MHz--; in lines 21 and 38, "δC" should be --$\delta_c$--.

In column 21, first diagram, insert --(30)-- under the diagram; in lines 53 and 54, "electron withdrawing" should be --electron-withdrawing--; in lines 62 and 63, "electron withdrawing" should be --electron-withdrawing--.

In column 22, line 67, insert --:-- after the word "formula".

In column 23, line 3, insert --:-- after the word "formula"; in line 7, insert -:-- after the word "of"; in line 40, "dihexyloxynaphthylene" should be --dihexyloxynaphthalene--.

Signed and Sealed this

First Day of October, 1996

Attest:

BRUCE LEHMAN

*Attesting Officer*   *Commissioner of Patents and Trademarks*